(12) United States Patent
Oguri

(10) Patent No.: US 10,029,689 B2
(45) Date of Patent: Jul. 24, 2018

(54) VEHICLE CONTROL APPARATUS

(71) Applicant: TOYOTA JIDOSHA KABUSHIKI KAISHA, Toyota-shi (JP)

(72) Inventor: Haruki Oguri, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/278,631

(22) Filed: Sep. 28, 2016

(65) Prior Publication Data

US 2017/0113675 A1    Apr. 27, 2017

(30) Foreign Application Priority Data

Oct. 22, 2015   (JP) ................................ 2015-208000

(51) Int. Cl.
*B60W 10/06* (2006.01)
*B60W 10/08* (2006.01)
(Continued)

(52) U.S. Cl.
CPC ....... *B60W 30/18127* (2013.01); *B60K 6/445* (2013.01); *B60W 10/06* (2013.01); *B60W 10/08* (2013.01); *B60W 10/184* (2013.01); *B60W 10/26* (2013.01); *B60W 20/12* (2016.01); *B60W 20/14* (2016.01); *B60W 30/146* (2013.01); *B60W 50/082* (2013.01); *B60W 2520/10* (2013.01); *B60W 2540/04* (2013.01); *B60W 2540/10* (2013.01); *B60W 2550/22* (2013.01); *B60W 2550/402* (2013.01); *B60W 2720/10* (2013.01); *B60W 2720/103* (2013.01);
(Continued)

(58) Field of Classification Search
None
See application file for complete search history.

(56) References Cited

U.S. PATENT DOCUMENTS

2013/0226380 A1    8/2013 Ando et al.
2015/0019057 A1    1/2015 Morisaki et al.
(Continued)

FOREIGN PATENT DOCUMENTS

JP    2013-177026    9/2013
JP    2014-19247    2/2014
(Continued)

*Primary Examiner* — Rami Khatib
(74) *Attorney, Agent, or Firm* — Oblon, McClelland, Maier & Neustadt, L.L.P.

(57) ABSTRACT

A control apparatus applied to a hybrid vehicle of the invention executes a regeneration control for charging a battery with electricity generated by a motor generator while applying regeneration braking force to the vehicle from the motor generator. The apparatus executes an enlarged regeneration control for charging the battery with the electricity generated by the motor generator while applying increased regeneration braking force to the vehicle from the motor generator when a target deceleration end position is set. The apparatus executes a control for controlling a vehicle speed to a speed equal to or smaller than an upper limit speed when a control execution request is generated. The apparatus forbids the enlarged regeneration control when the control execution request is generated and the vehicle speed is equal to or larger than a threshold vehicle speed smaller than the upper limit speed.

2 Claims, 12 Drawing Sheets

(51) Int. Cl.
  *B60W 10/18* (2012.01)
  *B60W 10/26* (2006.01)
  *B60W 20/00* (2016.01)
  *B60W 30/18* (2012.01)
  *B60K 6/22* (2007.10)
  *B60K 6/50* (2007.10)
  *B60K 6/445* (2007.10)
  *B60W 50/08* (2012.01)
  *B60W 10/184* (2012.01)
  *B60W 30/14* (2006.01)
  *B60W 20/12* (2016.01)
  *B60W 20/14* (2016.01)

(52) U.S. Cl.
  CPC ....... *B60Y 2300/89* (2013.01); *Y02T 10/6239* (2013.01); *Y02T 10/6286* (2013.01); *Y02T 10/84* (2013.01); *Y10S 903/915* (2013.01); *Y10S 903/93* (2013.01)

(56) References Cited

U.S. PATENT DOCUMENTS

2015/0019097 A1  1/2015  Morisaki et al.
2015/0134168 A1* 5/2015  Kawakami ............. B60K 6/485
                                                701/22

FOREIGN PATENT DOCUMENTS

JP       2015-16810      1/2015
JP       2015-19521      1/2015

\* cited by examiner

VEHICLE CONTROL APPARATUS

BACKGROUND OF THE INVENTION

Field of the Invention

The present invention relates to a vehicle control apparatus applied to a hybrid vehicle and capable of executing an enlarged regeneration control for increasing an amount of electricity (or electric energy) recovered to a rechargeable battery and a vehicle speed limit control for controlling a vehicle speed to a speed smaller than an upper limit vehicle speed.

Description of the Related Art

There is known a vehicle control apparatus (hereinafter, will be referred to as "the conventional apparatus") configured to execute the enlarged regeneration control. In particular, the conventional apparatus is configured to execute a control for executing following processes (1) to (3) as the enlarged regeneration control (see JP 2015-19521 A).

(1) A process for predicting a target stop position or a target deceleration end position where a vehicle is stopped by a driver of the vehicle along a scheduled traveling route on the basis of route information on the scheduled traveling route acquired from a navigation device.

(2) A process for performing an informing for prompting the driver to release an acceleration pedal when the vehicle arrives at a suitable first position before the vehicle arrives at the target stop position.

(3) A process for increasing a value of a regeneration braking force to a value larger than the value of the regeneration braking force generated upon the normal release of the acceleration pedal when the acceleration pedal is released after the vehicle arrives at a second position after the aforementioned informing is started.

According to this enlarged regeneration control, the large regeneration braking force is generated at an early timing and thereby, an amount of thermal energy consumed by a braking of the vehicle using a friction braking device can be decreased. Therefore, the amount of the electric energy (that is, regeneration electric power) recovered to the rechargeable battery can be increased and thus, fuel consumption of the vehicle can be decreased.

The conventional apparatus disclosed in JP 2015-19521 A is configured to execute the vehicle speed limit control or an ASL (Adaptive Speed Limitter) control. In particular, when the traveling speed of the hybrid vehicle becomes equal to or larger than a predetermined upper limit vehicle speed with an ASL mode having been selected by an ASL switch operated by the driver, the conventional apparatus controls the traveling speed of the hybrid vehicle to a speed equal to or smaller than the predetermined upper limit vehicle speed by decreasing at least a driving force of the hybrid vehicle.

In addition, the conventional apparatus disclosed in JP 2015-19521 A is configured to forbid an execution of the enlarged regeneration control when the ASL mode has been selected.

Thereby, when the hybrid vehicle travels under the ASL mode, a deceleration of the hybrid vehicle by the enlarged regeneration control is not performed and thus, the driver can be prevented from feeling discomfort.

However, when the execution of the enlarged regeneration control is forbidden, the amount of the electricity recovered to the rechargeable battery is decreased. Therefore, in order to recover a large amount of vehicle traveling energy to the rechargeable battery as the electricity, it is preferred to permit the execution of the enlarged regeneration control when the ASL mode has been selected and the driver is unlikely to feel strong discomfort.

SUMMARY OF THE INVENTION

The present invention has been made on the basis of the aforementioned knowledge. An object of the present invention is to provide a vehicle control apparatus capable of preventing the driver from feeling the strong discomfort due to the execution of the enlarged regeneration control when the ASL mode has been selected and executing the enlarged regeneration control at a high frequency to decrease the fuel consumption of the vehicle.

The vehicle control apparatus according to the present invention is applied to a hybrid vehicle having:

a vehicle driving source including an internal combustion engine (10) and a motor generator (12); and a battery (14) for supplying electricity to the motor generator (12), the battery (14) being configured to be charged with electricity generated by the motor generator (12).

The vehicle control apparatus comprises a control section (50) configured to control an operation of the internal combustion engine (10) and an activation of the motor generator (12).

The control section (50) includes normal regeneration control means, enlarged regeneration control means and vehicle speed limit control means described below.

The normal regeneration control means is configured to execute a normal regeneration control for charging the battery (14) with the electricity generated by the motor generator (12) while applying normal regeneration braking force to at least one vehicle wheel (19) from the motor generator (12) (see a process of a step 985 of FIG. 9, a process of a step 1090 of FIG. 10 and a process of steps 1235, 1270, 1260 and 1265 of FIG. 12) when an operation amount (AP) of an acceleration operator (35) is zero (see a determination "No" at a step 1020 of FIG. 10).

The enlarged regeneration control means is configured to execute an enlarged regeneration control for applying increased regeneration braking force to the at least one vehicle wheel (19) from the motor generator (12) and charging the battery (14) with the electricity generated by the motor generator (12) (see a process of a step 970 of FIG. 9, the process of the step 1090 of FIG. 10 and the processes of the steps 1235, 1270, 1260 and 1265 of FIG. 12) when a position (Pend) where a deceleration of the hybrid vehicle is predicted to end is set as a target deceleration end position (Ptgt) where the deceleration of the hybrid vehicle ends (see a determination "Yes" at a steps 905 and a process of a step 910 of FIG. 9) and the operation amount (AP) of the acceleration operator (35) is zero (see a determination "Yes" at a step 965 of FIG. 9), the increased regeneration braking force being larger than the normal regeneration braking force.

The vehicle speed limit control means is configured to control the operation of the internal combustion engine (10) and the activation of the motor generator (12) to decrease driving force output from the internal combustion engine (10) for driving the hybrid vehicle such that a traveling speed (V) of the hybrid vehicle is controlled to a speed equal to or smaller than an upper limit vehicle speed (Vset) (see processes of steps 1050 to 1070 of FIG. 10, a routine of FIG. 11, in particular, processes of steps 1120 and 1130 of FIG. 11 and processes of steps 1250 to 1265 of FIG. 12) when a control execution request is generated due to an operation of a switch (84) by an occupant of the hybrid vehicle (see a determination "Yes" at a step 1030 of FIG. 10 and a determination "Yes" at a step 1240 of FIG. 12) and the traveling speed (V) of the hybrid vehicle exceeds the upper limit vehicle speed (Vset) (see a determination "Yes" at a step 1040 of FIG. 10 and a determination "Yes" at a step 1245 of FIG. 12).

When the control execution request for requesting the execution of the vehicle speed limit control is generated due to the operation of the switch and the traveling speed of the hybrid vehicle becomes equal to or larger than the upper limit vehicle speed, the hybrid vehicle is decelerated by the vehicle speed limit control. In this case, the deceleration of the hybrid vehicle is derived from a decrease of the driving force which is a positive value. Thus, a magnitude of the deceleration of the hybrid vehicle is smaller than a magnitude of the deceleration derived from the enlarged regeneration control (that is, the deceleration derived from the increased regeneration braking force applied when the operation amount of the acceleration operator is zero). Therefore, normally, the driver recognizes that the magnitude of the deceleration of the hybrid vehicle generated by the vehicle speed limit control is small.

Further, the vehicle speed limit control functions when the upper limit vehicle speed becomes larger than the upper limit vehicle speed. Therefore, in general, the driver recognizes that the deceleration of the hybrid vehicle is generated by the vehicle speed limit control when the traveling speed of the hybrid vehicle corresponds generally to the upper limit vehicle speed.

On the other hand, the magnitude of the deceleration of the hybrid vehicle generated by the enlarged regeneration control is large. Accordingly, when the enlarged execution control is executed with the present situation where the vehicle speed limit control may function (that is, the control execution request for requesting the execution of the vehicle speed limit control due to the operation of the switch is generated) and the traveling speed of the hybrid vehicle is smaller than and adjacent to the upper limit vehicle speed, a large magnitude of the deceleration of the hybrid vehicle is generated at an unexpected timing. Therefore, the driver feels a strong discomfort.

On the other hand, even when the deceleration of the hybrid vehicle generated by the enlarged regeneration control starts with the traveling speed of the hybrid vehicle being smaller than the upper limit vehicle speed and being different from the upper limit vehicle speed to some extent, the driver can recognize that the deceleration of the hybrid vehicle is not generated by the vehicle speed limit control. Therefore, the driver is unlikely to feel the strong discomfort.

Accordingly, the control section further includes enlarged regeneration control forbiddance means configured to forbid an execution of the enlarged regeneration control (see a process of a step 840 of FIG. 8 and a process of a step 955 of FIG. 9) when the control execution request is generated (see a determination "Yes" at a step 810 of FIG. 8) and the traveling speed (V) of the hybrid vehicle is equal to or larger than a threshold vehicle speed (Vth) smaller than the upper limit vehicle speed (Vset) by a predetermined vehicle speed (dVkai) (see a determination "Yes" at a step 830 of FIG. 8).

As a result, when the control execution request is generated and the traveling speed (V) of the hybrid vehicle is equal to or larger than the threshold vehicle speed (Vth), that is, when the driver can predict the generation of the deceleration derived from the vehicle speed limit control, the execution of the enlarged regeneration control is forbidden. Therefore, the driver is prevented from feeling the strong discomfort. In addition, when the control execution request is not generated and when the control execution request is generated and the traveling speed (V) of the hybrid vehicle is smaller than the threshold vehicle speed (Vth), in other words, when the driver does not predict the generation of the deceleration derived from the vehicle speed limit control, the execution of the enlarged regeneration control is permitted. Therefore, an opportunity of the execution of the enlarged regeneration control is increased and thus, fuel consumption of the hybrid vehicle can be decreased.

According to one aspect of the present invention, the enlarged regeneration control means is configured to execute the enlarged regeneration control to:

start an informing for prompting the driver to release the acceleration operator (35) (see a process of a step 960 of FIG. 9) when the hybrid vehicle arrives at a predetermined first position (Pind) before the target deceleration end position (Ptgt) (see the determination "Yes" of the step 905 of FIG. 9) and the target deceleration end position (Ptgt) is set (see the process of the step 910 of FIG. 9); and apply the increased regeneration braking force to the at least one vehicle wheel (see the process of the step 970 of FIG. 9 and the processes of the steps 1235, 1270, 1260 and 1265 of FIG. 12) after the hybrid vehicle arrives at a predetermined second position (Pmb) between the predetermined first position (Pind) and the target deceleration end position (Ptgt) (see a determination "Yes" at a step 965 of FIG. 9).

When the driver releases the acceleration operator at an early timing with the target deceleration end position being set, a timing of start of the execution of the enlarged regeneration control is advanced and thus, the amount of the electricity recovered to the battery is increased. According to the one aspect of the present invention, the informing for prompting the driver to release the acceleration operator is performed and thus, a possibility that the driver releases the acceleration operator at a suitable timing is increased. Accordingly, an amount of a traveling energy of the hybrid vehicle recovered by the enlarged regeneration control to the battery as the electricity is likely to be increased.

Further, according to a preferred aspect of the present invention, the hybrid vehicle may have an input device (an upper limit vehicle speed setting lever 85) operated by the driver to set a desired upper limit vehicle speed and the vehicle speed limit control means may be configured to use the set desired limit vehicle speed as the upper limit vehicle speed (Vset). Thereby, the traveling speed of the hybrid vehicle can be limited to the speed desired by the driver.

According to a further preferred aspect of the present invention, the hybrid vehicle may have a wireless communication device (80) configured to receive an upper limit vehicle speed to be applied to the hybrid vehicle from an outside of the hybrid vehicle through a wireless communication and the vehicle speed limit control means may be configured to use the received upper limit vehicle speed as the upper limit vehicle speed (Vset). Thereby, for example, the driver can travel the hybrid vehicle at a speed equal to or smaller than a legal limit vehicle speed only by operating a switch (an ASL switch 84) operated by an occupant (in particular, the driver) of the hybrid vehicle.

According to a further preferred aspect of the present invention, the hybrid vehicle may have limit vehicle speed recognition means (82, 54) configured to recognize an upper limit vehicle speed to be applied to the hybrid vehicle by acquiring an upper limit vehicle speed described on a traffic sign installed along a road, along which the hybrid vehicle travels, as image data and processing the image data and the vehicle speed limit control means may be configured to use the recognized upper limit vehicle speed as the upper limit vehicle speed (Vset). Thereby, the driver can travel the hybrid vehicle assuredly at a speed equal to or smaller than the upper limit vehicle speed described on the traffic sign.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Figure 1:
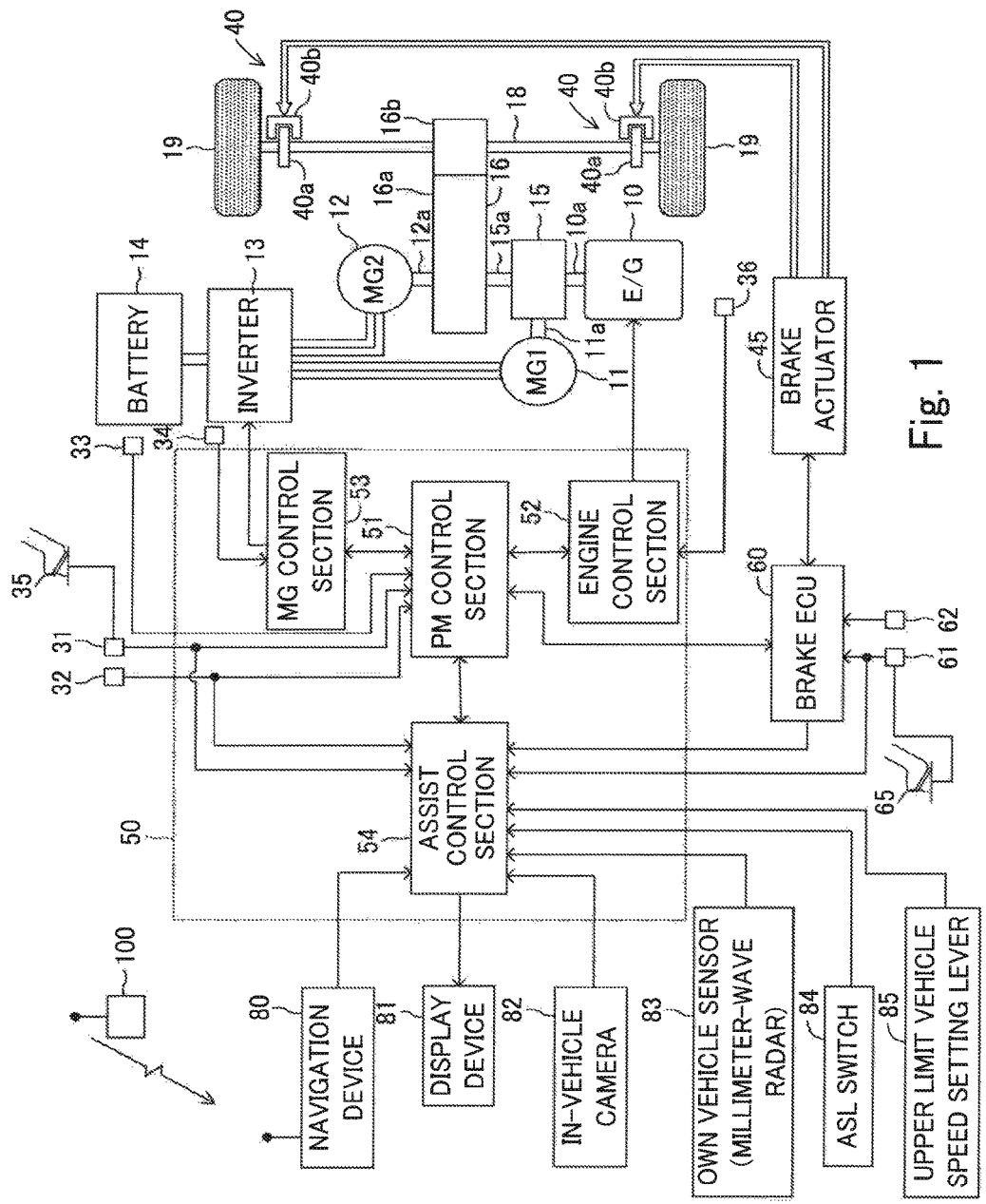
FIG. 1 is a general system configuration view for showing a vehicle control apparatus according to an embodiment of the present invention.

Below, a vehicle control apparatus according to an embodiment of the present invention will be described with reference to the drawings. Hereinafter, the vehicle control apparatus according to the embodiment will be referred to as "the embodiment control apparatus". As shown in FIG. 1, a vehicle, on which the embodiment control apparatus is installed, is a hybrid vehicle. Hereinafter, this vehicle will be referred to as "the own vehicle".

The own vehicle has, as travel driving apparatus, an internal combustion engine 10 as a vehicle driving source, a first motor generator 11 (i.e., a first electric motor 11) as the vehicle driving source, and a second motor generator 12 (i.e., a second electric motor 12) as the vehicle driving source, an inverter 13, a rechargeable battery 14, a power distribution mechanism 15, a power transmission mechanism 16 and a hybrid electronic control unit 50.

The engine 10 is a gasoline internal combustion engine (a spark ignition type internal combustion engine). However, the engine 10 may be a diesel internal combustion engine (a compression ignition type internal combustion engine).

The power distribution mechanism 15 distributes a torque output from the engine 10 to a torque for rotating an output shaft 15a of the power distribution mechanism 15 and a torque for driving the first motor generator 11 as an electric generator with a predetermined ratio (i.e., a predetermined distribution property). Hereinafter, the torque output from the engine 10 will be referred to as "the engine torque" and the first motor generator 11 will be referred to as "the first MG 11".

The power distribution mechanism 15 is constituted by a planetary gear mechanism (not shown). The planetary gear mechanism has at least one sun gear, pinion gears, at least one planetary carrier and at least one ring gear (not shown).

A rotation shaft of the planetary carrier is connected to an output shaft 10a of the engine 10. The rotation shaft of the planetary carrier transmits the engine torque to the sun gear and the ring gear through the pinion gears. A rotation shaft of the sun gear is connected to a rotation shaft 11a of the first MG 11. The rotation shaft of the sun gear transmits the engine torque input into the sun gear to the first MG 11. When the engine torque is transmitted from the sun gear to the first MG 11, the first MG 11 is rotated by the transmitted engine torque to generate electricity. A rotation shaft of the ring gear is connected to an output shaft 15a of the power distribution mechanism 15 and the engine torque input into the ring gear is transmitted from the power distribution mechanism 15 to the power transmission mechanism 16 through the output shaft 15a.

The power transmission mechanism 16 is connected to the output shaft 15a of the power distribution mechanism 15 and a rotation shaft 12a of the second motor generator 12. Hereinafter, the second motor generator 12 will be referred to as "the second MG 12". The power transmission mechanism 16 includes a reduction gear train 16a and a differential gear 16b.

The reduction gear train 16a is connected to a vehicle wheel drive shaft 18 through the differential gear 16b. Therefore, the engine torque input into the power transmission mechanism 16 from the output shaft 15a of the power distribution mechanism 15 and the engine torque input into the power transmission mechanism 16 from the rotation shaft 12a of the second MG 12 are transmitted to right and left front vehicle wheels 19, which are drive wheels, respectively, through the vehicle wheel drive shaft 18. In this regard, the drive wheels 19 may be right and left rear vehicle wheels and may be right and left front and rear vehicle wheels.

It should be noted that the power distribution mechanism 15 and the power transmission mechanism 16 are known (for example, see JP 2013-177026 A).

The first and second MGs 11 and 12 are permanent magnet synchronous motors, respectively. The first and second MGs 11 and 12 are electrically connected to an inverter 13. The inverter 13 has first and second inverter circuits, separately. The first inverter circuit drives the first MG 11 and the second inverter circuit drives the second MG 12.

When the first MG 11 should be activated as a motor, the inverter 13 converts direct current electricity supplied from the battery 14 to three-phase alternating current electricity. Then, the inverter 13 supplies the three-phase alternating current electricity to the first MG 11. On the other hand, when the second MG 12 should be activated as a motor, the inverter 13 converts direct current electricity supplied from the battery 14 to three-phase alternating current electricity. Then, the inverter 13 supplies the three-phase alternating current electricity to the second MG 12.

When the rotation shaft 11*a* of the first MG 11 is rotated by external force such as traveling energy of the own vehicle or the engine torque, the first MG 11 is activated as an electric generator to generate the electricity. When the first MG 11 is activated as the electric generator, the inverter 13 converts the three-phase alternating current electricity generated by the first MG 11 to the direct current electricity. Then, the inverter 13 charges the battery 14 with the direct current electricity.

When the traveling energy of the own vehicle is input as the external force into the first MG 11 from the driving wheels 19 through the vehicle wheel drive shaft 18, the power transmission mechanism 16 and the power distribution mechanism 15, regeneration braking force (or regeneration braking torque) is applied to the driving wheels 19 by the first MG 11.

When the rotation shaft 12*a* of the second MG 12 is rotated by the external force, the second MG 12 is activated as the electric generator to generate the electricity. When the second MG 12 is activated as the electric generator, the inverter 13 converts the three-phase alternating current electricity generated by the second MG 12 to the direct current electricity. Then, the inverter 13 charges the battery 14 with the direct current electricity.

When the traveling energy of the own vehicle is input as the external force into the second MG 12 from the drive wheels 19 through the vehicle wheel drive shaft 18 and the power transmission mechanism 16, the regeneration braking force (or the regeneration braking torque) is applied to the driving wheels 19 by the second MG 12.

The hybrid electronic control unit 50 has a power management control section 51, an engine control section 52, a motor generator control section 53 and an assist control section 54. Hereinafter, the hybrid electronic control unit 50 will be simply referred to as "the control unit 50". Each of the control sections 51, 52, 53 and 54 has, as a main part, a microcomputer including a CPU, a ROM (or a memory), a RAM, a back-up RAM (or a non-volatile memory) and the like. The CPU of each of the control sections 51, 52, 53 and 54 is configured or programmed to execute instructions or programs stored in the ROMs of the control sections 51, 52, 53 and 54, respectively to realize various functions described later.

The power management control section 51 is electrically connected to the engine control section 52 and the motor generator control section 53 such that the power management control section 51 can send and receive information or signals to and from the engine control section 52 and the motor generator control section 53. Hereinafter, the power management control section 51 will be referred to as "the PM control section 51". The PM control section 51, the engine control section 52 and the motor generator control section 53 acquire detection values of sensors described later on the basis of signals sent from the sensors.

The PM control section 51 is electrically connected to an acceleration pedal operation amount sensor 31, a vehicle speed sensor 32 and a battery sensor 33. The acceleration pedal operation amount sensor 31 outputs a signal representing an amount AP of an operation of an acceleration pedal 35 as an acceleration operator to the PM control section 51. Hereinafter, the amount AP will be referred to as "the acceleration pedal operation amount AP". The vehicle speed sensor 32 outputs a signal representing a traveling speed V of the own vehicle to the PM control section 51. Hereinafter, the traveling speed V will be referred to as "the own vehicle speed V".

The battery sensor 33 includes an electric current sensor, an electric voltage sensor and a temperature sensor. The electric current sensor of the battery sensor 33 outputs a signal representing an electric current flowing into the battery 14 or flowing out from the battery 14 to the PM control section 51. The electric voltage sensor of the battery sensor 33 outputs a signal representing an electric voltage of the battery 14 to the PM control section 51. The temperature sensor of the battery sensor 33 outputs a signal representing temperature of the battery 14 to the PM control section 51.

Further, the PM control section 51 calculates an amount of the electricity flowing into the battery 14 (i.e., a charged electricity amount) by a known method on the basis of the electric current flowing into the battery 14, the electric voltage of the battery 14 and the temperature of the battery 14. In addition, the PM control section 51 calculates an amount of the electricity flowing out from the battery 14 (i.e., a discharged electricity amount) on the basis of the electric current flowing out from the battery 14, the electric voltage of the battery 14 and the temperature of the battery 14. The PM control section 51 calculates or acquires an electricity amount SOC (State Of Charge) charged in the battery 14 by integrating the charged and discharged electricity amounts. Hereinafter, the electricity amount SOC will be referred to as "the battery charge amount SOC".

The engine control section 52 is electrically connected to various engine sensors 36 for detecting parameters representing operation states of the internal combustion engine 10, respectively. Further, the engine control section 52 is electrically connected to various engine actuators such as a throttle valve actuator, fuel injectors and ignition device (not shown) for controlling an operation of the engine 10. The engine control section 52 controls the engine actuators of the engine 10 to control the operation of the engine 10 (i.e., the engine torque generated by the engine 10 and an engine speed of the engine 10).

The motor generator control section 53 is electrically connected to MG sensors 34 such as a first rotation angle sensor, a second rotation angle sensor, a first electric voltage sensor, a second electric voltage sensor, a first electric current sensor, a second electric current sensor and a temperature sensor. Signals (or output values) output from the MG sensors 34 are used for controlling the first and second MGs 11 and 12. The motor generator control section 53 controls the inverter 13 to control activations of the first and second MGs 11 and 12. Hereinafter, the motor generator control section 53 will be referred to as "the MG control section 53".

The first and second rotation angle sensors of the MG sensors 34 output signals representing a rotation angle of the first MG 11 and a rotation angle of the second MG 12 to the MG control section 53, respectively.

The first electric voltage sensor of the MG sensors 34 outputs a signal representing an electric voltage applied from the battery 14 to the first MG 11 through the inverter 13 or applied from the first MG 11 to the battery 14 through the inverter 13 to the MG control section 53.

The second electric voltage sensor of the MG sensors 34 outputs a signal representing an electric voltage applied from the battery 14 to the second MG 12 through the inverter 13 or applied from the second MG 12 to the battery 14 through the inverter 13 to the MG control section 53.

The first electric current sensor of the MG sensors 34 outputs a signal representing an electric current flowing into the first MG 11 from the battery 14 through the inverter 13 or flowing into the battery 14 from the first MG 11 through the inverter 13 to the MG control section 53.

The second electric current sensor of the MG sensors 34 outputs a signal representing an electric current flowing into the second MG 12 from the battery 14 through the inverter 13 or flowing into the battery 14 from the second MG 12 through the inverter 13 to the MG control section 53.

The assist control section 54 has, as a main part, a microcomputer including a CPU, a ROM (or a memory), a RAM, a back-up RAM (or a non-volatile memory) and the like. The assist control section 54 is electrically connected to the acceleration pedal operation amount sensor 31, the vehicle speed sensor 32, a brake sensor 61, a navigation device 80, a display device 81, an in-vehicle camera 82, an own vehicle sensor 83, an ASL switch and an upper limit vehicle speed setting lever 85.

The brake sensor 61 outputs a signal representing an amount BP of an operation of a brake pedal 65 to the assist control section 54 and a brake electronic control unit 60. Hereinafter, the amount BP will be referred to as "the brake pedal operation amount BP".

The navigation device 80 has a GPS sensor, an acceleration sensor, a wireless communication device, a memory device, a display panel (including a sound generation device), a main control section and the like.

The GPS sensor detects a present position P of the own vehicle on the basis of radio wave from a GPS satellite. The acceleration sensor detects a traveling direction of the own vehicle.

The wireless communication device receives road information and the like sent from the outside of the own vehicle through a wireless communication. The memory device stores another road information including a map data, the road information received by the wireless communication device and the like. The display panel provides a driver of the own vehicle with various information. The main control section calculates a scheduled traveling route to a destination which is set by the driver, an arrival time when the own vehicle arrives at the destination and the like. Then, the main control section displays the calculated scheduled traveling route, the calculated arrival time and the like on the display panel.

The road information includes road map information, road category information, road gradient information, altitude information, road shape information, legal limit speed information, intersection position information, stop line position information, traffic light information, traffic congestion information, information on an upper limit of the vehicle speed applied to the own vehicle traveling along the road and the like. Hereinafter, the upper limit of the vehicle speed will be referred to as "the upper limit vehicle speed".

Further, the navigation device 80 acquires the traffic light information and the traffic congestion information on the basis of signals sent from external communication devices 100 such as beacons installed along the road through the wireless communication.

The display device 81 is provided in front of a driver's seat of the own vehicle. A display area for displaying an acceleration pedal release prompting display (i.e., a display area for performing an informing for prompting the driver to release the acceleration pedal 35 as an acceleration operator described later) is formed in the display device 81. The acceleration pedal release prompting display displayed by the display device 81 may be a display capable of prompting the driver to release the acceleration pedal 35 and various kinds of displays such as illustrations, marks and characters may be employed as the acceleration pedal release prompting display. Further, a configuration for informing the driver by a sound generation device (for example, a voice announcement) as well as a configuration for informing the driver by the display device 81 may be employed as the acceleration pedal release prompting display.

The in-vehicle camera 82 is mounted on a stay or the like of an inner rear viewer (i.e., a so-called room mirror) provided on a front part of a body of the own vehicle. A direction of an optic axis of the in-vehicle camera 82 corresponds to a longitudinal direction of the body of the own vehicle (i.e., a traveling direction of the own vehicle) when the in-vehicle camera 82 is mounted on the body of the own vehicle. Therefore, the in-vehicle camera 82 can take a view existing in the traveling direction of the own vehicle (i.e., ahead of the own vehicle) to acquire an image (image data) of the view. The in-vehicle camera 82 is, for example, a CCD camera.

The assist control section 54 acquires the image data from the in-vehicle camera 82. Then, the assist control section 54 processes the image data to acquire an upper limit of the vehicle speed (i.e., the upper limit vehicle speed) described on a traffic sign included in the view taken by the in-vehicle camera 82.

The own vehicle sensor 83 is a known millimeter wave radar sensor. The own vehicle sensor 83 sends a millimeter wave (i.e., an output wave) ahead of the own vehicle. When there is a vehicle traveling in front of the own vehicle, the millimeter wave is reflected by the vehicle traveling in front of the own vehicle. The own vehicle sensor 83 receives the reflected wave. Hereinafter, the vehicle traveling in front of the own vehicle will be referred to as "the preceding vehicle".

The assist control section 54 detects or traps the preceding vehicle on the basis of the reflected wave received by the own vehicle sensor 83. Further, the assist control section 54 acquires a difference between the traveling speed of the own vehicle and a traveling speed of the preceding vehicle (i.e., a relative speed), a distance between the own vehicle and the preceding vehicle (i.e., an inter-vehicle distance), an orientation of the preceding vehicle with respect to the own vehicle (i.e., a relative orientation) and the like on the basis of a phase difference between the millimeter wave sent from the own vehicle sensor 83 and the received reflected wave, a damping level of the reflected wave, a detection time of the reflected wave and the like.

The ASL switch 84 or the vehicle speed limit control switch 84 is an ON-OFF switch which is operated by the driver of the own vehicle. When the ASL switch 84 is set at the ON-position, the assist control section 54 sets a traveling mode of the own vehicle to an ASL control mode. In other words, when a position of the ASL switch 84 is changed from the OFF-position to the ON-position, an ASL control execution request or a vehicle speed limit control execution request is generated. When the own vehicle speed V of the own vehicle becomes equal to or larger than the upper limit vehicle speed Vset, the assist control section 54 starts an execution of a vehicle speed limit control described later for maintaining or controlling the own vehicle speed V at or to a speed equal to or smaller than the upper limit vehicle speed Vset. When the ASL switch 84 is set at the OFF-position, the assist control section 54 terminates the execution of the vehicle speed limit control. Hereinafter, the vehicle speed limit control will be referred to as "the ASL control".

The driver uses the upper limit vehicle speed setting lever 85 for setting the upper limit vehicle speed Vset used in the ASL control when the ASL switch 84 is set at the ON-position. In particular, when the ASL switch 84 is set at the ON-position and the upper limit vehicle speed setting lever 85 is operated to be set at a position for increasing the upper limit vehicle speed Vset, the assist control section 54 increases the upper limit vehicle speed Vset. On the other hand, when the ASL switch 84 is set at the ON-position and the upper limit vehicle speed setting lever 85 is operated to be set at a position for decreasing the upper limit vehicle speed Vset, the assist control section 54 decreases the upper limit vehicle speed Vset. The assist control section 54 stores the upper limit vehicle speed Vset acquired upon the stop of the driver's operation of the upper limit vehicle speed setting lever 85 as the upper limit vehicle speed Vset in the RAM of the assist control section 54.

The own vehicle has friction brake mechanisms 40, a brake actuator 45 and the brake electronic control unit 60. The friction brake mechanisms 40 are provided at the right and left drive wheels 19 and the right and left rear wheels (not shown). FIG. 1 shows the friction brake mechanisms 40 provided at the right and left drive wheels 19. Each of the friction brake mechanisms 40 has a brake disc 40a mounted on the corresponding vehicle wheel and a brake caliper 40b mounted on the body of the own vehicle. Each of the friction brake mechanisms 40 activates a wheel cylinder built in the brake caliper 40b by a pressure of a hydraulic oil supplied from the brake actuator 45 to press the brake pad (not shown) against the brake disc 40a to generate the friction braking force or torque. Hereinafter, the pressure of the hydraulic oil will be referred to as "the hydraulic pressure".

The brake actuator 45 is a known actuator for independently adjusting the hydraulic pressure supplied to the wheel cylinder built in the brake caliper 40b of each of the vehicle wheels. The brake actuator 45 has, for example, a depression force hydraulic pressure circuit and a control hydraulic pressure circuit. The depression force hydraulic pressure circuit supplies the hydraulic oil from a master cylinder to the wheel cylinders. The master cylinder pressurizes the hydraulic oil by a depression force of the driver against the brake pedal 65 (a brake pedal depression force). The control hydraulic pressure circuit supplies controllable control hydraulic pressure to each of the wheel cylinders, independently of the brake pedal depression force.

The control hydraulic pressure circuit has a dynamic hydraulic pressure generation device, control valves, hydraulic pressure sensors and the like. Elements constituting the brake actuator 45 are not shown. The dynamic hydraulic pressure generation device includes a boost pump and an accumulator. The dynamic hydraulic pressure generation device generates a high hydraulic pressure. Each of the control valves adjusts the hydraulic pressure output from the dynamic hydraulic pressure generation device and supplies the hydraulic pressure controlled to a target hydraulic pressure to the corresponding wheel cylinder. Each of the hydraulic pressure sensors detects the hydraulic pressure of the corresponding hydraulic cylinder. An actuator described, for example, in the JP 2014-19247 A or the like can be used as the brake actuator 45.

The brake electronic control unit 60 has a microcomputer as a main part. The microcomputer includes a CPU, a ROM (or a memory), a RAM, a back-up RAM (or a non-volatile memory) and the like. The brake electronic control unit 60 can send and receive information to and from the PM control section 51 of the control unit 50. The brake electronic control unit 60 is electrically connected to the brake sensor 61 and the vehicle wheel speed sensors 62. The brake electronic control unit 60 acquires detection values output from the brake sensor 61 and the vehicle wheel speed sensors 62. Hereinafter, the brake electronic control unit 60 will be referred to as the brake ECU 60".

Each of the vehicle wheel speed sensors 62 outputs a signal representing vehicle wheel speed $\omega h$ of the corresponding vehicle wheel to the brake ECU 60.

<Normal Acceleration/Deceleration Control>

Next, a normal acceleration/deceleration control including a normal regeneration control executed by the embodiment control apparatus (in particular, the control unit 50) will be described. The PM control section 51 of the embodiment control apparatus acquires the rotation angle of the second MG 12 acquired by the MG control section 53. The PM control section 51 acquires a rotation speed NM2 of the second MG 12 on the basis of the acquired rotation angles. Hereinafter, the rotation speed NM2 will be referred to as "the second MG rotation speed NM2".

Figure 2:
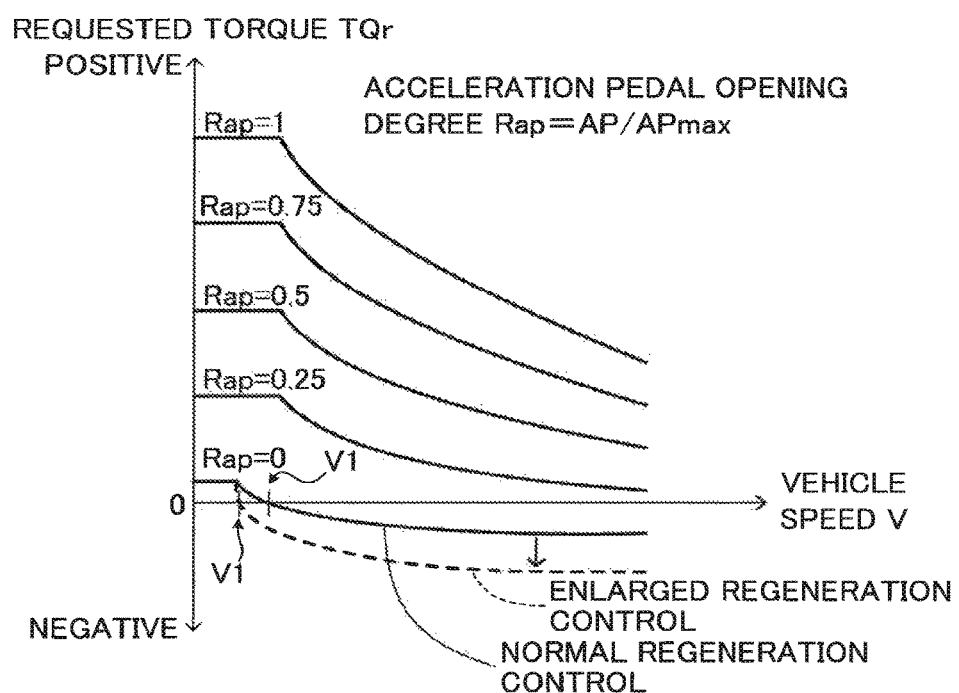
FIG. 2 is a view for showing a look-up table to be used for acquiring a requested torque.

Further, the PM control section 51 applies the acceleration pedal operation amount AP and the own vehicle speed V of the own vehicle to a look-up table MapTQr(AP,V) used for the normal acceleration/deceleration control shown by a solid line in FIG. 2 to acquire a requested torque TQr. The requested torque TQr is a torque requested by the driver as a driving torque to be supplied to the drive wheels 19 to drive the drive wheels 19.

According to the look-up table MapTQr(AP,V), the requested torque TQr increases as a ratio Rap of the acceleration pedal operation amount AP with respect to a maximum value APmax of the acceleration pedal operation amount AP increases (Rap=AP/APmax) when the own vehicle speed V is constant.

In particular, according to the look-up table MapTQr(AP, V) for the normal acceleration/deceleration control, the requested torque TQr is a negative value and an absolute value of the requested torque TQr increases as the own vehicle speed V increases when the acceleration pedal operation amount AP is zero (that is, an acceleration pedal opening degree is zero) and the own vehicle speed V is larger than a switching speed V1. In this case, the requested torque TQr is a regeneration braking torque (or a normal regeneration braking torque or a normal regeneration braking force) required for braking the driving wheels 19 of the own vehicle by the second MG 12.

When the acceleration pedal operation amount AP is larger than zero, the PM control section 51 calculates an output power Pr* to be input into the drive wheels 19 by multiplying the requested torque TQr by the second MG rotation speed NM2 (Pr*=TQr·NM2). Hereinafter, the output power Pr* will be referred to as "the requested driving output power Pr*".

Further, the PM control section 51 acquires an output power Pb* to be input into the first MG 11 for causing the battery charge amount SOC to approach a target value SOCtgt of the battery charge amount SOC on the basis of a difference dSOC between the target value SOCtgt of the battery charge amount SOC and the present battery charge amount SOC (dSOC=SOCtgt−SOC). Hereinafter, the target value SOCtgt will be referred to as "the target charge amount SOCtgt" and the output power Pb* will be referred to as "the requested charge output power Pb*". The requested charge output power Pb* increases as the charge amount difference dSOC increases (see a block B in FIG. 11).

The PM control section 51 calculates a sum of the requested driving output power Pr* and the requested charge output power Pb* as an output power Pe* to be output from the engine 10 (Pe*=Pr*+Pb*). Hereinafter, the output power Pe* will be referred to as "the requested engine output power Pe*".

The PM control section 51 determines whether or not the requested engine output power Pe* is smaller than a lower limit value of an optimum operation output power of the engine 10. The lower limit value of the optimum operation output power of the engine 10 is a minimum value of an output power capable of causing the engine 10 to operate at an efficiency equal to or larger than a predetermined efficiency. The optimum operation output power is defined by a combination of an engine torque TQeop and an engine speed NEeop.

When the requested engine output power Pe* is smaller than the lower limit value of the optimum operation output power of the engine 10, the PM control section 51 sets a target value TQetgt of the engine torque and a target value NEtgt of the engine speed to zero, respectively. Hereinafter, the target value TQetgt will be referred to as "the target engine torque TQetgt" and the target value NEtgt will be referred to as "the target engine speed NEtgt". The PM control section 51 sends the target engine torque TQetgt and the target engine speed NEtgt to the engine control section 52.

Further, the PM control section 51 calculates a target value TQ2tgt to be output from the second MG 12 for supplying an output power corresponding to the requested driving output power Pr* to the drive wheels 19 on the basis of the second MG rotation speed NM2. Hereinafter, the target value TQ2tgt will be referred to as "the target second MG torque TQ2tgt". The PM control section 51 sends the target second MG torque TQ2tgt to the MG control section 53.

On the other hand, when the requested engine output power Pe* is equal to or larger than the lower limit value of the optimum operation output power of the engine 10, the PM control section 51 sets target values of the optimum engine torque TQeop and the optimum engine speed NEeop capable of outputting an output power corresponding to the requested engine output power Pe* from the engine 10 as the target engine torque TQetgt and the target engine speed NEtgt, respectively. The PM control section 51 sends the target engine torque TQetgt and the target engine speed NEtgt to the engine control section 52.

Further, the PM control section 51 calculates the target first MG rotation speed NM1tgt on the basis of the target engine speed NEtgt and the second MG rotation speed NM2. The PM control section 51 calculates the target first MG torque TQ1tgt on the basis of the target engine torque TQetgt, the target first MG rotation speed NM1tgt, the present first MG rotation speed NM1 and a distribution property of the engine torque of the power distribution mechanism 15.

In addition, the PM control section 51 calculates the target second MG torque TQ2tgt on the basis of the requested torque TQr, the target engine torque TQetgt and the distribution property of the engine torque of the power distribution mechanism 15.

The PM control section 51 sends the target first MG rotation speed NM1tgt, the target first MG torque TQ1tgt and the target second MG torque TQ2tgt to the MG control section 53.

The engine control section 52 controls the operation of the engine 10 such that the target engine torque TQetgt and the target engine speed NEtgt sent from the PM control section 51 are achieved. When the target engine torque TQetgt and the target engine speed NEtgt are zero, respectively, the engine control section 52 stops the operation of the engine 10.

On the other hand, the MG control section 53 controls the inverter 13 to control the activations of the first and second MGs 11 and 12 such that the target first MG rotation speed NM1tgt, the target first MG torque TQ1tgt and the target second MG torque TQ2tgt sent from the PM control section 51 are achieved. At this time, when the first MG 11 generates an electricity, the second MG 12 may be activated by the electricity supplied from the battery 14 and the electricity generated by the first MG 11.

It should be noted that there is known a method for calculating the target engine torque TQetgt, the target engine speed NEtgt, the target first MG torque TQ1tgt, the target first MG rotation speed NM1tgt and the target second MG torque TQ2tgt in the own vehicle (for example, see JP 2013-177026 A).

On the other hand, when the acceleration pedal operation amount AP is zero, the PM control section 51 executes the normal regeneration control. That is, when the acceleration pedal operation amount AP is zero, the PM control section 51 sets the target engine torque TQetgt and the target engine speed NEtgt to zero, respectively. Further, the PM control section 51 sets the requested torque TQr as the target second MG torque TQ2tgt in accordance with a property shown by a solid line corresponding to Rap=0 shown in FIG. 2. When the own vehicle speed V is larger than the switching vehicle speed V1, the thus-set requested torque TQr is a negative value (i.e., the regeneration braking torque). On the other hand, when the own vehicle speed V is equal to or smaller than the switching vehicle speed V1, the requested torque TQr is a positive value (i.e., the driving torque).

The PM control section 51 sends the target engine torque TQetgt and the target engine speed NEtgt to the engine control section 52. In addition, the PM control section 51 sends the target first MG torque TQ1tgt, the target first MG rotation speed NM1tgt and the target second MG torque TQ2tgt to the MG control section 53.

In this case, the engine control section 52 stops the operation of the engine 10. The MG control section 53 controls the activation of the second MG 12 such that the target second MG torque TQ2tgt is achieved.

<Friction Braking Control>

Next, a friction braking control executed by the embodiment control apparatus will be described. The brake ECU 60 executes the friction braking control when the brake pedal operation amount BP is larger than zero. That is, the brake ECU 60 determines a requested braking torque TQbr on the basis of the brake pedal operation amount BP.

The PM control section 51 receives the requested braking torque TQbr from the brake ECU 60. Then, the PM control section 51 calculates or acquires a target friction braking torque TQfbtgt by adding the target second MG torque TQ2tgt to the requested braking torque TQbr (TQfbtgt=TQbr+TQ2tgt). An absolute value of the calculated target friction braking torque TQfbtgt is smaller than an absolute value of the requested braking torque TQbr when the target second MG torque TQ2tgt is a negative value (i.e., a regeneration braking torque). The absolute value of the calculated target friction braking torque TQfbtgt is larger than the absolute value of the requested braking torque TQbr when the target second MG torque TQ2tgt is a positive value (i.e., a driving torque).

The brake ECU 60 receives the target friction braking torque TQfbtgt from the PM control section 51. The brake ECU 60 controls an activation of the brake actuator 45 such that a braking torque corresponding to one quarter of the target friction braking torque TQfbtgt is applied to each of the four vehicle wheels including the drive wheels 19.

It should be noted that when the brake pedal operation amount BP is larger than zero, the acceleration pedal operation amount AP is zero and thus, the engine control section 52 stops the operation of the engine 10.

<ASL Control>

Next, the ASL control (i.e., the vehicle speed limit control) executed by the embodiment control apparatus will be described. When the ASL switch 84 is set at the ON-position by the driver and thus, the ASL control performance request is generated, the assist control section 54 sets an operation mode of the own vehicle to an ASL control mode and executes the ASL control.

In particular, the assist control section 54 generates a request for decreasing the requested torque TQr with respect to the PM control section 51 when the own vehicle speed V becomes equal to or larger than the upper limit vehicle speed Vset in the ASL control mode. Thereby, the PM control section 51 calculates a difference dV of the present own vehicle speed V with respect to the upper limit vehicle speed Vset (dV=Vset−V). Then, the PM control section 51 calculates a correction amount dTQr for correcting the requested torque TQr thereby to control the own vehicle speed V to the upper limit vehicle speed Vset on the basis of the difference dV. Hereinafter, the difference dV will be referred to as "the vehicle speed difference dV" and the correction amount dTQr will be referred to as "the requested torque correction amount dTQr".

The PM control section 51 calculates a conclusive requested torque TQrc by subtracting the requested torque correction amount dTQr from the requested torque TQr (TQrc=TQr−dTQr). Hereinafter, the conclusive requested torque TQrc will be referred to as "the corrected requested torque TQrc". The PM control section 51 uses the corrected requested torque TQrc to determine the target engine torque TQetgt, the target engine speed NEtgt, the target first MG torque TQ1tgt, the target first MG rotation speed NM1tgt and the target second MG torque TQ2tgt as described above.

Thereby, when the own vehicle speed V is larger than the upper limit vehicle speed Vset, the requested torque TQr is decreased and as a result, the own vehicle speed V decreases. Accordingly, the own vehicle speed V is controlled to the upper limit vehicle speed Vset. It should be noted that in the case that the ASL switch 84 is set at the OFF-position and thus, no ASL control execution request is generated, even when the own vehicle speed V becomes equal to or larger than the upper limit vehicle speed Vset, the assist control section 54 and the PM control section 51 do not correct the requested torque TQr.

<Deceleration Prediction Assist Control>

Next, a deceleration prediction assist control including an enlarged regeneration control executed by the embodiment control apparatus will be described. For example, when a momentary stop line is provided on a scheduled vehicle traveling road, the driver normally releases the acceleration pedal 35 first and next, operates the brake pedal 65 to stop the own vehicle at the momentary stop line. In this case, if regeneration braking torques applied to the drive wheels 19, respectively by the second MG 12 is increased upon the release of the acceleration pedal 35, an amount of the electricity recovered to the battery 14 from the release of the acceleration pedal 35 until the start of the operation of the brake pedal 65 increases.

Further, if the regeneration braking torque is increased upon the release of the acceleration pedal 35, a deceleration of the own vehicle is increased and thus, the operation of the brake pedal 65 may be started more closely to the momentary stop line. Otherwise, even when the operation of the brake pedal 65 is started at the same position as the case that the regeneration braking torque is not increased, the own vehicle speed V upon the start of the operation of the brake pedal 65 is small. Therefore, thermal energy consumed in the friction braking decreases. For the reasons described above, the amount of the electricity recovered to the battery 14 is increased.

The assist control section 54 executes the deceleration prediction assist control for assisting the driver in cooperation with the PM control section 51 such that the amount of the electricity recovered to the battery 14 is increased.

In particular, the assist control section 54 learns positions on the map where the brake pedal 65 is released with a high frequency on the basis of a history of a daily driving of the driver. Then, the assist control section 54 stores or learns or registers the learned position as deceleration end positions Pend, respectively in the back-up RAM of the assist control section 54. Further, the assist control section 54 stores or learns or registers the own vehicle speed V acquired upon arrival of the own vehicle at each of the deceleration end positions Pend as a deceleration end vehicle speed Vend in the back-up RAM of the assist control section 54 in association with the corresponding deceleration end position Pend.

The assist control section 54 acquires the brake pedal operation amount BP, the own vehicle speed V and the position P (including a traveling direction) of the own vehicle detected by the navigation device 80 when an ignition switch of the own vehicle is positioned at the ON-position in order to learn the deceleration end position Pend and the deceleration end vehicle speed Vend. Hereinafter, the position P will be referred to as "the own vehicle position P".

Each time the assist control section 54 detects that the brake pedal 65 is released on the basis of the brake pedal operation amount BP, the assist control section 54 stores the present own vehicle position P and the present own vehicle speed V in the back-up RAM of the assist control section 54 in association with each other. The assist control section 54 calculates a frequency of the release of the brake pedal 65 at each of the stored own vehicle positions P and extracts the own vehicle positions P each having the frequency higher than a threshold. The assist control section 54 stores the extracted own vehicle positions P in the back-up RAM of the assist control section 54 as the deceleration end positions Pend, respectively and stores an average of the own vehicle speeds V stored in association with each of the deceleration end positions Pend in the back-up RAM of the assist control section 54 as a deceleration end vehicle speed Vend.

Further, the assist control section 54 reads traffic light information received by the navigation device 80 from outside communication devices 100 each installed along the road. The traffic light information includes information on a present lighting color (green or yellow or red) of each of a traffic light, information on a position where each of the traffic lights is installed, information on a time required for the lighting color of each of the traffic lights to change from green to yellow, information on a time required for the lighting color of the traffic light to change from yellow to red and information on a time for the lighting color of the traffic light to change from red to green.

The assist control section 54 predicts a lighting state of the traffic light when the own vehicle arrives at a stop line at the intersection where the traffic light is installed on the basis of a distance from the present own vehicle position P to the stop line at the intersection where the traffic light is installed and the present own vehicle speed V. In other words, the assist control section 54 predicts whether or not the driver will stop the own vehicle at the stop line at the intersection.

When the assist control section 54 predicts that the driver will stop the own vehicle at the stop line at the intersection, the assist control section 54 stores a position of the stop line in the RAM of the assist control section 54 as the deceleration end position Pend. In addition, the assist control section 54 stores the own vehicle speed V upon arrival of the own vehicle at the deceleration end position Pend (in this case, 0 km/h) in the RAM of the assist control section 54 as the deceleration end vehicle speed Vend in association with the deceleration end position Pend.

When the assist control section 54 determines that the deceleration end position Pend exists on the scheduled traveling route within a predetermined distance (for example, hundreds of meters) from the present own vehicle position P, the assist control section 54 starts to execute the deceleration prediction assist control.

When the assist control section 54 starts to execute the deceleration prediction assist control, the assist control section 54 sets the deceleration end position Pend existing on the scheduled traveling route within the predetermined distance from the present own vehicle position P as a target deceleration end position Ptgt. It should be noted that when a plurality of the deceleration end positions Pend exist, the assist control section 54 sets the deceleration end position Pend closest to the present own vehicle position P as the target deceleration endo position Ptgt. In addition, the assist control section 54 sets the deceleration end vehicle speed Vend stored in the RAM or the back-up RAM of the assist control section 54 in association with the set deceleration end position Pend as a target deceleration end vehicle speed Vtgt.

Figure 3:
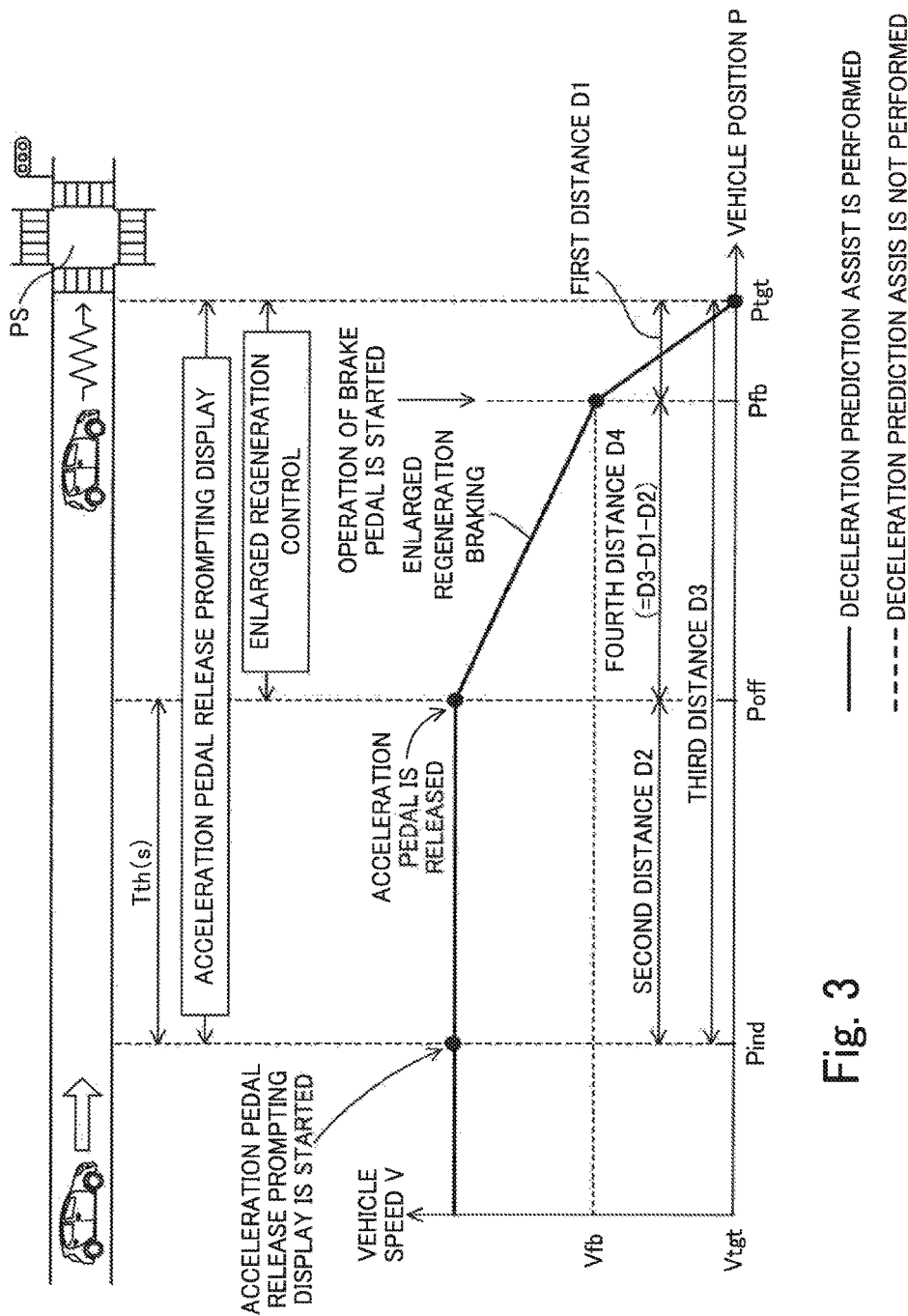
FIG. 3 is a view used for describing an enlarged regeneration control (i.e., a deceleration prediction assist control).

As shown in FIG. 3, the assist control section 54 calculates or acquires a position Pfb where a standard driver starts to operate the brake pedal 65 in order to achieve the target deceleration end vehicle speed Vtgt at the target deceleration end position Ptgt. In addition, the assist control section 54 calculates or acquires a traveling speed Vfb of the own vehicle when the own vehicle arrives at the position Pfb. Hereinafter, the position Pfb will be referred to as "the brake pedal operation start position Pfb" and the traveling speed Vfb will be referred to as "the brake pedal operation start vehicle speed Vfb".

That is, when the target deceleration end vehicle speed Vtgt is determined, a distance D1 between the target deceleration end position Ptgt and the brake pedal operation start position Pfb and the brake pedal operation start vehicle speed Vfb are defined. Hereinafter, the distance D1 will be referred to as "the first distance D1".

Accordingly, the assist control section 54 stores a relationship between the target deceleration end vehicle speed Vtgt and the first distance D1 and a relationship between the target deceleration end vehicle speed Vtgt and the brake pedal operation start vehicle speed Vfb in the ROM of the assist control section 54 in the form of a look-up table. The assist control section 54 applies the target deceleration end vehicle speed Vtgt to the look-up table to calculate or acquire the first distance D1 and the brake pedal operation start vehicle speed Vfb. Further, the assist control section 54 calculates the brake pedal operation start position Pfb on the basis of the acquired first distance D1 and the target deceleration end position Ptgt.

In addition, the assist control section 54 calculates a distance D2 that the own vehicle travels at the present own vehicle speed V for a predetermined time Tth (in this embodiment, two seconds) and a distance D3 between the present own vehicle position P and the target deceleration end position Ptgt. Hereinafter, the predetermined time Tth will be referred to as "the threshold time Tth", the distance D2 will be referred to as "the second distance D2" and the distance D3 will be referred to as "the third distance D3".

The assist control section 54 calculates a distance D4 that the own vehicle is braked only by the regeneration braking torque by subtracting the first and second distances D1 and D2 from the third distance D3 (D4=D3−D1−D2). The distance D4 will be referred to as "the fourth distance D4".

The assist control section 54 applies an average of the present own vehicle speed V of the own vehicle and the brake pedal operation start vehicle speed Vfb to a property line of a requested torque TQr used in the enlarged regeneration control shown by a chained line in the look-up table shown in FIG. 2 to calculate the requested torque TQr corresponding to an enlarged regeneration braking torque TQmbk (TQmbk<0) which is a regeneration braking torque (or an enlarged regeneration braking force or an increased regeneration braking force) upon the execution of the enlarged regeneration control. It should be noted that the look-up table MapTQr(AP,V) used in the normal acceleration/deceleration control is a table consisting of the property lines shown by solid lines in FIG. 2. The look-up table MapTQr(AP,V) used in the enlarged regeneration control corresponds to a table obtained by replacing the property line corresponding to Rap=0 and shown by the solid line in FIG. 2 with a property line shown by a chained line in FIG. 2.

The assist control section 54 calculates an estimated vehicle speed Vest which is the own vehicle speed V when the own vehicle has traveled the fourth distance D4 with the deceleration Gd generated by the enlarged regeneration braking torque TQmbk after the own vehicle has traveled the second distance D2 from the present own vehicle position P. The estimated vehicle speed Vest is smaller than the brake pedal operation start vehicle speed Vfb when a timing of starting an application of the regeneration braking torque is too early. That is, the estimated vehicle speed Vest is larger than the brake pedal operation start vehicle speed Vfb when the timing of starting the application of the regeneration braking torque is too late.

Accordingly, the assist control section 54 starts to cause the display device 81 to display a display (hereinafter, will be referred to as "an acceleration pedal release prompting display") for prompting the driver to release the acceleration pedal 35 when the estimated vehicle speed Vest becomes equal to or larger than the brake pedal operation start vehicle speed Vfb. In other words, the assist control section 54 performs an informing for prompting the driver to release the acceleration pedal 35. The display device 81 displays the acceleration pedal release prompting display in response to an acceleration pedal release signal output from the assist control section 54.

Next, the deceleration prediction assist control after the starting of the acceleration pedal release prompting display will be described with reference to FIG. 4. A change of the own vehicle speed V shown by a solid line in FIG. 4 is a change of the own vehicle speed V predicted in the case that the deceleration prediction assist control is executed and a change of the own vehicle speed V shown by a chained line in FIG. 4 is a change of the own vehicle speed V predicted in the case that the deceleration prediction assist control is not executed.

Figure 4:
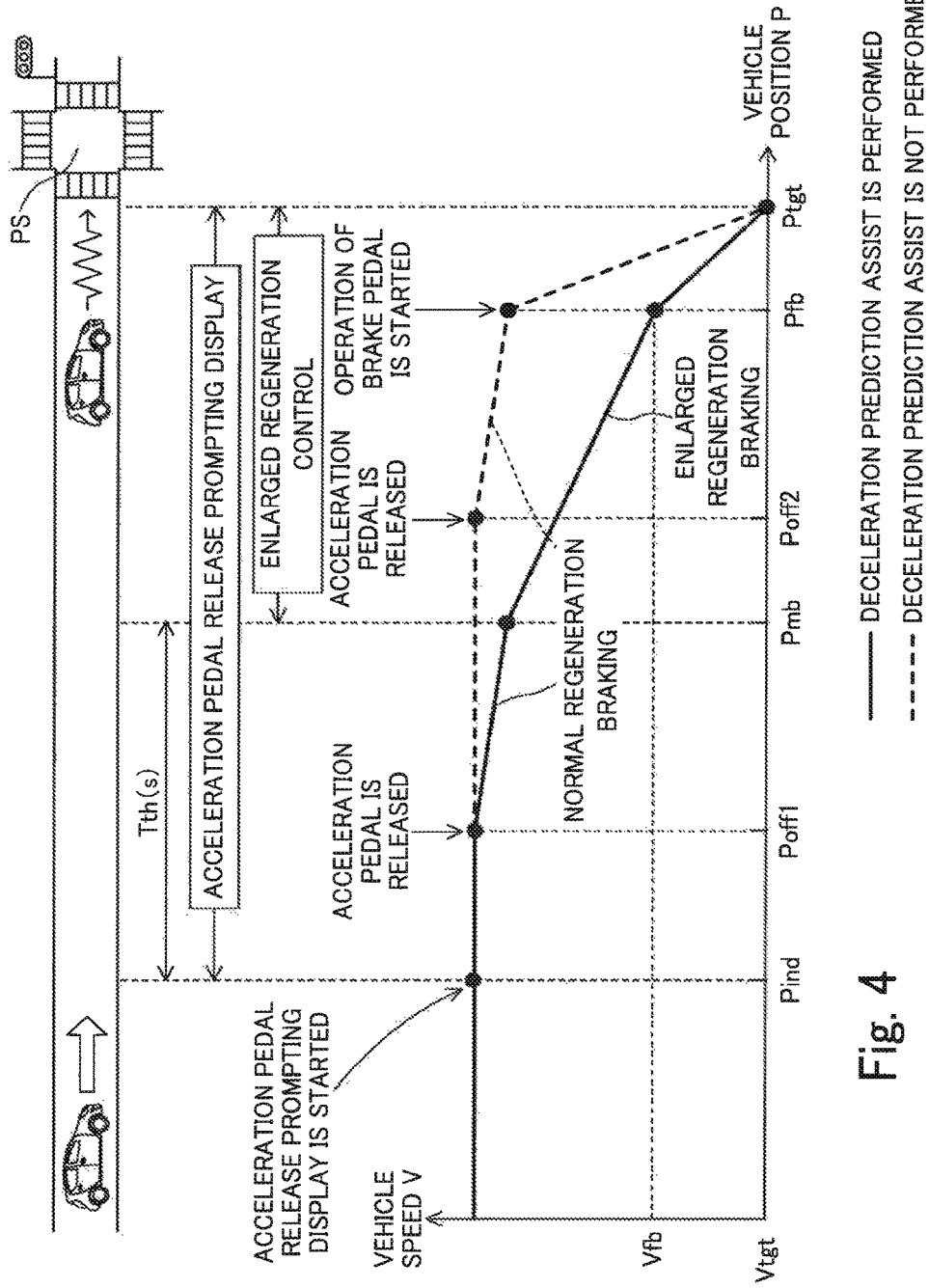
FIG. 4 is a view used for describing the enlarged regeneration control.

FIG. 4 shows a case that the acceleration pedal 35 is released at a position Poff1 before the threshold time Tth elapses after the acceleration pedal release prompting display is started. In this case, the PM control section 51 applies the present own vehicle speed V to the property line of the requested torque TQr used in the normal regeneration control shown by the solid line in the look-up table shown in FIG. 2 and corresponding to a case that the acceleration opening degree Rap (i.e., the acceleration pedal operation amount AP) is zero to calculate the requested torque TQr. In other words, the PM control section 51 calculates a regeneration braking torque TQmbn (<0) used in the normal regeneration control. Then, the PM control section 51 decelerates the own vehicle by the regeneration braking torque TQmbn until the threshold time Tth elapses. Hereinafter, the regeneration braking torque TQmbn used in the normal regeneration control will be referred to as "the normal regeneration braking torque TQmbn".

Then, when the threshold time Tth elapses at a position Pmb, the assist control section 54 sends a command for causing the PM control section 51 to use the property line of the requested torque TQr used in the enlarged regeneration control shown by the chained line in the look-up table shown in FIG. 2 to the PM control section 51. As a result, when the acceleration pedal operation amount AP is zero, the PM control section 51 applies the present own vehicle speed V to the property line of the requested torque TQr used in the enlarged regeneration control each time a predetermined time elapses to calculate the requested torque TQr (i.e., the enlarged regeneration braking torque TQmbk). Then, the PM control section 51 decelerates the own vehicle by the enlarged regeneration braking torque TQmbk.

Then, when the driver starts to operate the brake pedal 65 at the brake pedal operation start position Pfb, the PM control section 51 calculates the target friction braking torque TQfbtgt by adding the enlarged regeneration braking torque TQmbk to the requested braking torque TQbr acquired on the basis of the brake pedal operation amount BP (TQfbtgt=TQbr+TQmbk). Then, the PM control section 51 sends the calculated target friction braking torque TQfbtgt to the brake ECU 60.

When the own vehicle arrives at the target deceleration end position Ptgt, the assist control section 54 sends a command for causing the PM control section 51 to use the property line of the requested torque TQr used in the normal regeneration control shown by the solid line in the look-up table shown in FIG. 2 to the PM control section 51. As a result, the PM control section 51 controls the activation of the second MG 12 such that a half of the enlarged regeneration braking torque TQmbk is applied from the second MG 12 to the driving wheels 19, respectively until the own vehicle arrives at the target deceleration end position Ptgt. In addition, as described above, the brake ECU 60 controls the activation of the friction brake mechanism 40 such that one-quarter of the target friction braking torque TQfbtgt is applied to each of the four vehicle wheels including the driving wheels 19 by the friction brake mechanism 40.

Figure 5:
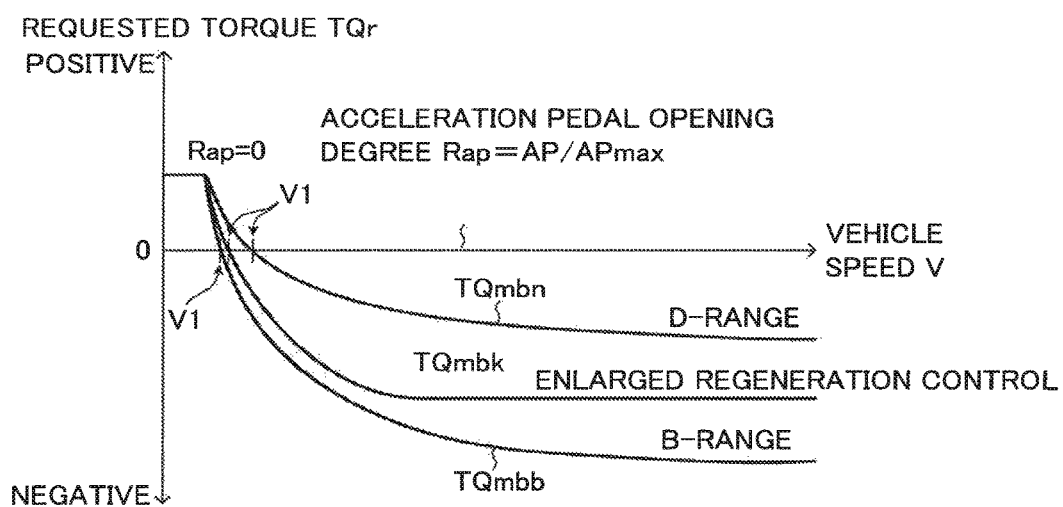
FIG. 5 is a view for showing a part of a look-up table to be used for acquiring the requested torque.

It should be noted that the enlarged regeneration control is executed when a shift lever of the own vehicle is set at a driving-range (i.e., a D-range). As shown in FIG. 5, the absolute value of the braking torque with the shift lever being set at the D-range and the enlarged regeneration control being executed, that is, the absolute value of the enlarged regeneration braking torque TQmbk, is larger than the absolute value of the braking torque with the enlarged regeneration control being not executed, that is, the absolute value of the normal regeneration braking torque TQmbn. Therefore, the amount of the electricity recovered to the battery 14 with the shift lever being set at the D-range and the enlarged regeneration control being executed, is larger than the amount of the electricity recovered to the battery 14 with the shift lever being set at the D-range and the enlarged regeneration control being not executed, that is, with the shift lever being set at the D-range and the normal acceleration/deceleration control being executed.

Further, as shown in FIG. 5, the absolute value of the enlarged regeneration braking torque TQmbk with the enlarged regeneration control being executed, is smaller than the absolute value of the regeneration braking torque TQmbb with the shift lever being set at a brake-range (i.e., a B-range). In addition, the absolute value of the enlarged regeneration braking torque TQmbk with the enlarged regeneration control being executed, is closer to the absolute value of the regeneration braking torque TQmbb with the shift lever being set at the B-range than the absolute value of the normal regeneration braking torque TQmbn with the shift lever being set at the D-range. As is known, when the acceleration pedal 35 is released, the braking torque provided from the engine 10 with the shift lever being set at the B-range is larger than the braking torque provided from the engine 10 with the shift lever being set at the D-range.

<Adjustment of ASL Control and Enlarged Regeneration Control>

When the ASL switch 84 is set at the ON-position, that is, the ASL control execution request is generated, a condition for executing the enlarged regeneration control may be satisfied. In addition, when the enlarged regeneration control is executed, the ASL switch 84 may be operated to be set at the ON-position and thus, the ASL control execution request may be generated.

In these cases, in order to prevent the driver from feeling discomfort due to a decrease of the own vehicle speed V which the driver does not expect by the enlarged regeneration control, the embodiment control apparatus forbids the execution of the enlarged regeneration control when the own vehicle speed V is equal to or larger than the threshold vehicle speed Vth acquired by subtracting a predetermined vehicle speed dVkai from the upper limit vehicle speed Vset (Vth=Vset−dVkai). Further, the embodiment control apparatus permits the execution of the enlarged regeneration control when the own vehicle speed V is smaller than the threshold vehicle speed Vth. It should be noted that the predetermined vehicle speed dVkai is about 5 to 10 percent of the upper limit vehicle speed Vset and is set, for example, 5 km/h when the upper limit vehicle speed Vset is 60 to 80 km/h.

Figure 6:
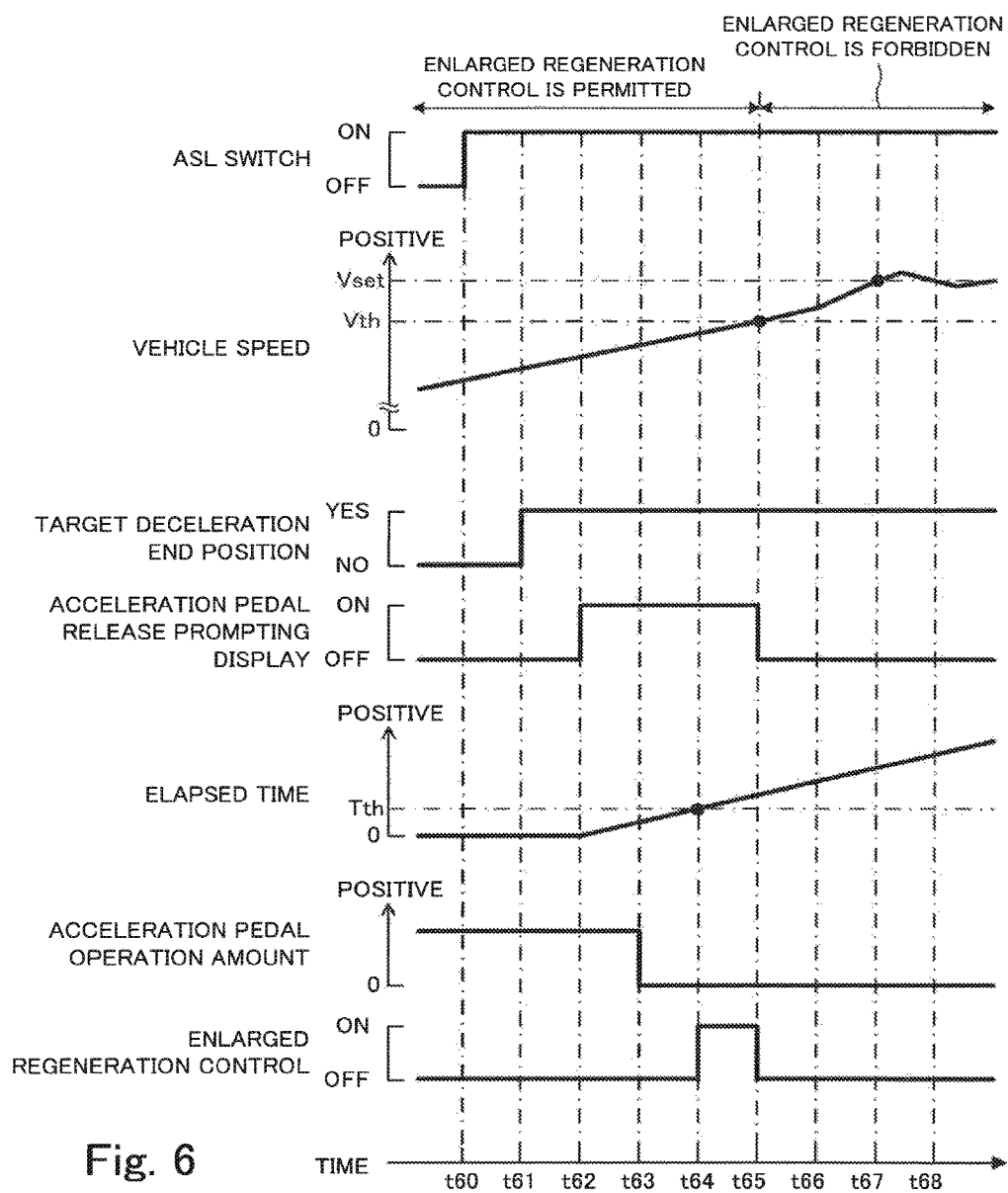
FIG. 6 is a view for showing a time chart used for describing an ASL control and the enlarged regeneration control.
Figure 7:
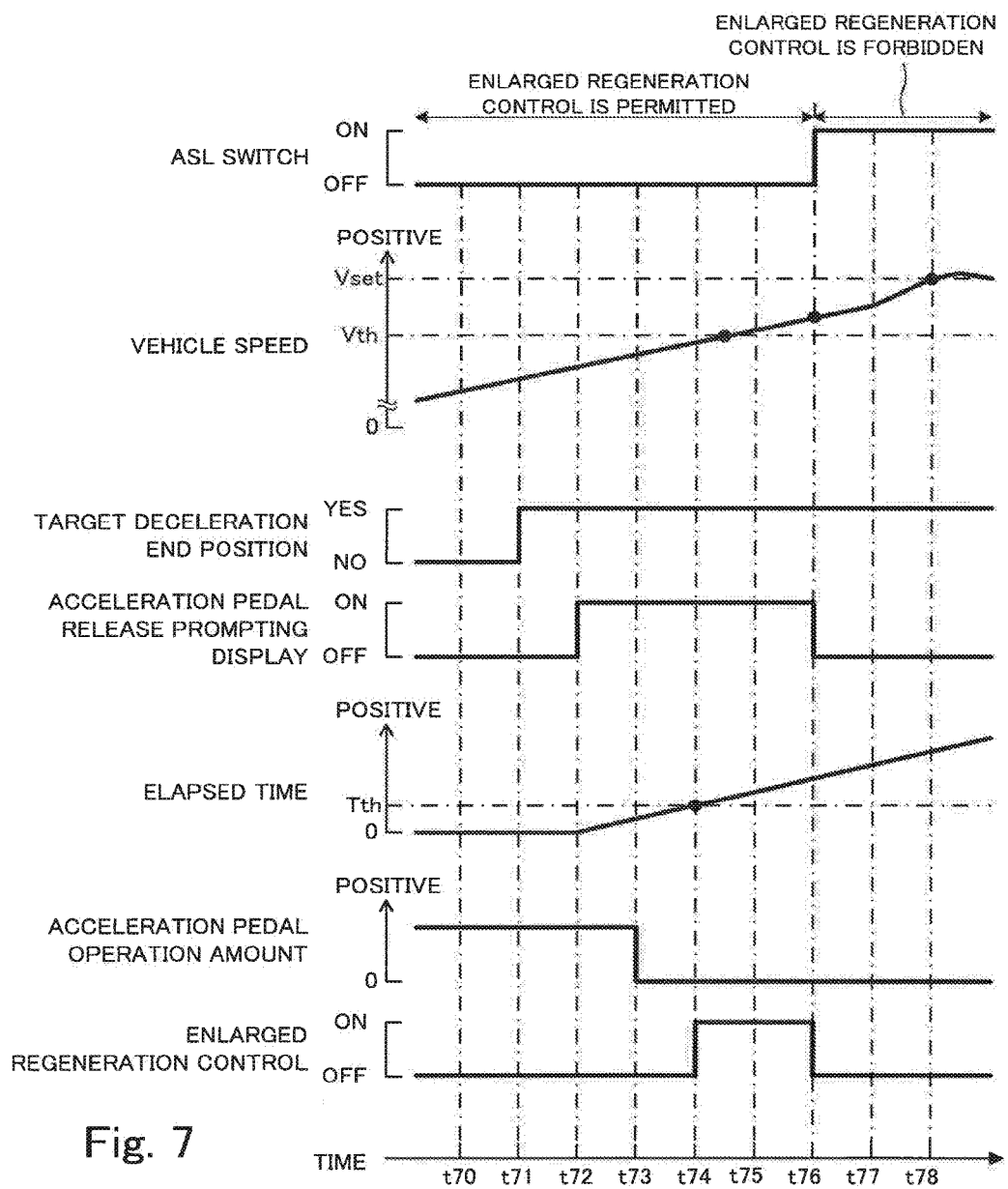
FIG. 7 is a view for showing a time chart used for describing the ASL control and the enlarged regeneration control.

Below, the permission and the forbiddance of the execution of the enlarged regeneration control by the embodiment control apparatus will be concretely described with reference to examples shown in FIGS. 6 and 7, respectively. FIG. 6 shows an example that the condition for executing the enlarged regeneration control is satisfied when the ASL switch 84 is set at the ON-position, that is, when the ASL control execution request is generated. FIG. 7 shows an example that the ASL switch 84 is set at the ON-position when the enlarged regeneration control is executed.

In the example shown in FIG. 6, following phenomena occur.

(1) At a time t60, the ASL switch 84 is set at the ON-position.

(2) At a time t61, the target deceleration end position Ptgt is set.

(3) At a time t62, the estimated vehicle speed Vest reaches the brake pedal operation start vehicle speed Vfb and thus, the acceleration pedal release prompting display is started and a measurement of a time T elapsing from the start of the acceleration pedal release prompting display is started. Hereinafter, the time T will be referred to as "the elapsed time T".

(4) At a time t63, the acceleration pedal 35 is released and thus, the acceleration pedal operation amount AP becomes zero.

(5) At a time 64, the elapsed time T reaches the threshold time Tth and thus, the condition for executing the enlarged regeneration control is satisfied. At the time t64, the ASL switch 84 is set at the ON-position and the own vehicle speed V is smaller than the threshold vehicle speed Vth. Thus, the embodiment control apparatus permits the execution of the enlarged regeneration control. Therefore, at this time t64, the enlarged regeneration control is started to be executed.

(6) After the time t64, the acceleration pedal operation amount AP continues to be zero, however, the own vehicle speed V increases, for example, due to the own vehicle traveling along a downslope. Then, at a time t65, the own vehicle speed V reaches the threshold vehicle speed Vth. At this time, the embodiment control apparatus forbids the execution of the enlarged regeneration control. Therefore, at the time t65, the execution of the enlarged regeneration control is terminated. At this time t65, the acceleration pedal release prompting display is also terminated.

(7) After the time t65, the own vehicle speed V continues to increase and at a time t67, the own vehicle speed V reaches the upper limit vehicle speed Vset. Therefore, after the time t67, the own vehicle speed V is controlled or maintained to the upper limit vehicle speed Vset by the ASL control.

In the example shown in FIG. 7, following phenomena occur.

(1) At a time t71, the target deceleration end position Ptgt is set.

(2) At a time t72, the estimated vehicle speed Vest reaches the brake pedal operation start vehicle speed Vfb and thus, the acceleration pedal release prompting display is started and the measurement of the elapsed time T is started.

(3) At a time t73, the acceleration pedal 35 is released, that is, the acceleration pedal operation amount AP becomes zero.

(4) At a time t74, the elapsed time T reaches the threshold time Tth. At this time t74, the ASL switch 84 is set at the OFF-position. Therefore, the embodiment control apparatus permits the execution of the enlarged regeneration control and thus, the enlarged regeneration control is executed.

(5) At a time t76, the ASL switch 84 is set at the ON-position. At this time t76, the own vehicle speed V is equal to or larger than the threshold vehicle speed Vth. Therefore, the embodiment control apparatus forbids the execution of the enlarged regeneration control. As a result, the execution of the enlarged regeneration control is terminated.

(6) After the time t76, the acceleration pedal operation amount AP continues to be zero, however, the own vehicle speed V increases for the reason, for example, that the own vehicle travels along the downslope and at a time t78, the own vehicle speed V reaches the upper limit vehicle speed Vset. Therefore, after the time t78, the own vehicle speed V is controlled or maintained to or at the upper limit vehicle speed Vset by the ASL control.

The summary of the operation of the embodiment control apparatus with both the condition for executing the ASL control and the condition for executing the enlarged regeneration control being satisfied, has been described. According to the embodiment control apparatus, when the ASL switch 84 is set at the ON-position and as a result, the ASL control execution request (i.e., the vehicle speed limit control execution request) is generated and the own vehicle speed V is equal to or larger than the threshold vehicle speed Vth and near the upper limit vehicle speed Vset, the execution of the enlarged regeneration control is forbidden. Therefore, a rapid decrease of the own vehicle speed V different from the decrease of the own vehicle speed V expected by the driver in the ASL control is prevented and as a result, the driver is prevented from feeling discomfort. On the other hand, when the ASL control execution request (i.e., the vehicle speed limit control execution request) is generated and the own vehicle speed V is not adjacent to the upper limit vehicle speed Vset, the execution of the enlarged regeneration control is permitted. Therefore, the enlarged regeneration control may be executed when the ASL control execution request is generated and thus, the amount of the vehicle traveling energy recovered as the electricity can be increased.

<Concrete Operation of Embodiment Control Apparatus>

Next, a concrete operation of the embodiment control apparatus will be described. The CPU of the assist control section 54 is configured or programmed to execute a routine shown by a flowchart in FIG. 8 each time a predetermined time elapses. Hereinafter, the CPU of the assist control section 54 will be referred to as "the assist CPU".

Figure 8:
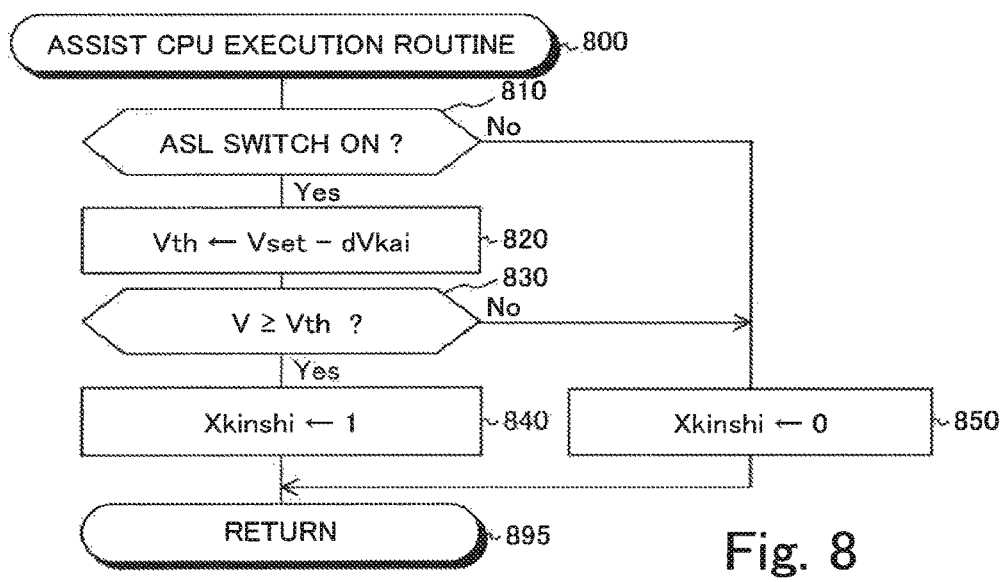
FIG. 8 is a view for showing a flowchart of a routine executed by a CPU of an assist control section shown in FIG. 1.

At a predetermined timing, the assist CPU starts a process from a step 800 of FIG. 8 and then, proceeds with the process to a step 810 to determine whether or not the ASL switch 84 is set at the ON-position. When the ASL switch 84 is set at the ON-position, the assist CPU determines "Yes" at the step 810 and then, proceeds with the process to a step 820 to calculate the threshold vehicle speed Vth by subtracting the predetermined vehicle speed dVkai from the presently-set upper limit vehicle speed Vset (V=Vset−dVkai).

Next, the assist CPU proceeds with the process to a step 830 to determine whether or not the own vehicle speed V is equal to or larger than the threshold vehicle speed Vth. When the own vehicle speed V is equal to or larger than the threshold vehicle speed Vth, the assist CPU determines "Yes" at the step 830 and then, proceeds with the process to a step 840 to set a value of an enlarged regeneration forbiddance flag Xkinshi to "1". Then, the assist CPU proceeds with the process to a step 895 to terminate an execution of this routine once. Hereinafter, the enlarged regeneration forbiddance flag Xkinshi will be referred to as "the forbiddance flag Xkinshi".

The value of the forbiddance flag Xkinshi is set to "0" during an initialization routine executed when a position of an ignition key switch (not shown) or a power switch (not shown) of the own vehicle is changed from an ON-position to an OFF-position. As described later, when the value of the forbiddance flag Xkinshi is "1", the execution of the enlarged regeneration control is forbidden. On the other hand, when the value of the forbiddance flag Xkinshi is "0", the execution of the enlarged regeneration control is permitted.

When the ASL switch 84 is set at the OFF-position upon the execution of the process of the step 810, the assist CPU determines "No" at the step 810 and then, proceeds with the process to a step 850 to set the value of the forbiddance flag Xkinshi to "0". Further, when the own vehicle speed V is smaller than the threshold vehicle speed Vth upon the execution of the process of the step 830, the assist CPU determines "No" at the step 830 and then, proceeds with the process to the step 850 to set the value of the forbiddance flag Xkinshi to "0". Then, the assist CPU proceeds with the process to the step 895 to terminate the execution of this routine once.

Figure 9:
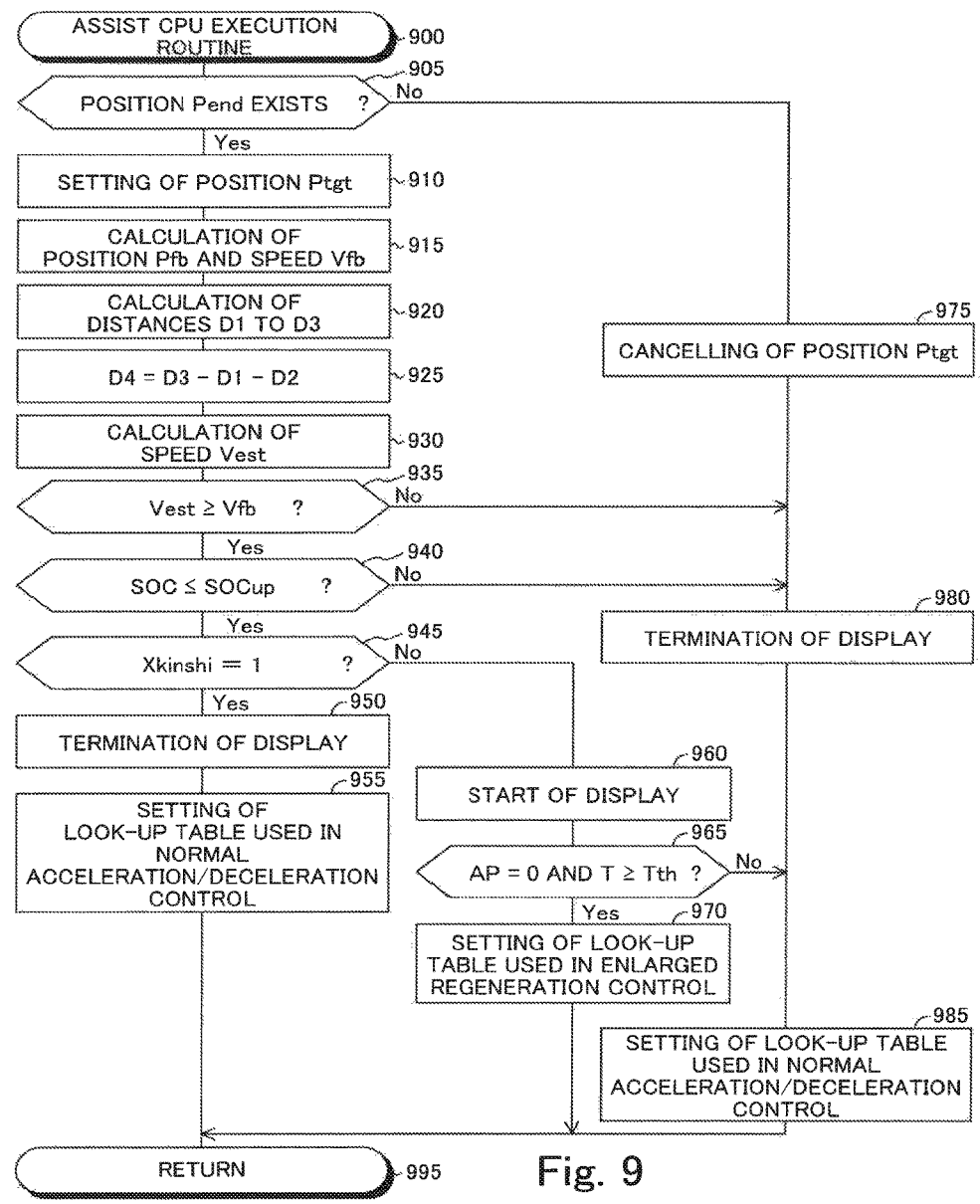
FIG. 9 is a view for showing a flowchart of a routine executed by the CPU of the assist control section shown in FIG. 1.

Further, the assist CPU is configured or programmed to execute a routine shown by a flowchart in FIG. 9 each time a predetermined time elapses. Therefore, at a predetermined timing, the assist CPU starts a process from a step 900 of FIG. 9 and then, proceeds with the process to a step 905 to determine whether or not the deceleration end position Pend exists on the scheduled vehicle traveling road within the predetermined distance from the present own vehicle position P.

When the deceleration end position Pend exists on the scheduled traveling road of the own vehicle within the predetermined distance from the present own vehicle position P, the assist CPU determines "Yes" at the step 905 and then, sequentially executes processes of steps 910 to 930. Then, the assist CPU proceeds with the process to a step 935.

Step 910: The assist CPU sets the deceleration end position Pend determined to exist at the step 905 as the target deceleration end position Ptgt.

Step 915: The assist CPU calculates the brake pedal operation start position Pfb and the brake pedal operation start vehicle speed Vfb on the basis of the present own vehicle position P and the present own vehicle speed V (see FIG. 3).

Step 920: The assist CPU calculates the first to third distances D1 to D3 on the basis of the brake pedal operation start position Pfb, the brake pedal operation start vehicle speed Vfb, the present own vehicle position P and the present own vehicle speed V (see FIG. 3).

Step 925: The assist CPU calculates the fourth distance D4 on the basis of the first to third distances D1 to D3 (D4=D3−D1−D2) (see FIG. 3).

Step 930: The assist CPU calculates the estimated vehicle speed Vest on the basis of the brake pedal operation start position Pfb, the present own vehicle speed V, the second distance D2, the fourth distance D4 and the deceleration Gd of the own vehicle with a half of the enlarged regeneration braking torque TQmbk being applied to each of the driving wheels 19.

When the assist CPU proceeds with the process to the step 935, the assist CPU determines whether or not the estimated vehicle speed Vest is equal to or larger than the brake pedal operation start vehicle speed Vfb. That is, the assist CPU determines whether or not the own vehicle speed V reaches the brake pedal operation start vehicle speed Vfb when the own vehicle arrives at the brake pedal operation start position Pfb assuming that the acceleration pedal release prompting display is started at the present time, the acceleration pedal 35 is released upon the elapsing of the threshold time Tth from the start of the acceleration pedal release prompting display and the execution of the enlarged regeneration control is started upon the release of the acceleration pedal 35.

When the estimated vehicle speed Vest is equal to or larger than the brake pedal operation start vehicle speed Vfb, the assist CPU determines "Yes" at the step 935 and then, proceeds with the process to a step 940 to determine whether or not the present battery charge amount SOC is equal to or smaller than an upper limit charge amount SOCup. The upper limit charge amount SOCup is set to an upper limit value of the battery charge amount SOC capable of preventing a deterioration of the battery 14.

When the battery charge amount SOC is equal to or smaller than the upper limit charge amount SOCup, the assist CPU determines "Yes" at the step 940 and then, proceeds with the process to a step 945. It should be noted that when the assist CPU determines "Yes" at the step 940, the condition of executing the enlarged regeneration control is satisfied.

When the assist CPU proceeds with the process to the step 945, the assist CPU determines whether or not the value of the forbiddance flag Xkinshi is "1". When the value of the forbiddance flag Xkinshi is "1", the assist CPU determines "Yes" at the step 945 and then, sequentially executes processes of step 950 and 955 described below. Then, the assist CPU proceeds with the process to a step 995 to terminate an execution of this routine once.

Step 950: The assist CPU causes the acceleration pedal release prompting display to be terminated if the acceleration pedal release prompting display is performed. On the other hand, the assist CPU forbids the performance of the acceleration pedal release prompting display if the acceleration pedal release prompting display is not performed.

Step 955: The assist CPU provides the CPU of the PM control section 51 with a command for causing the PM control section 51 to set the look-up table MapTQr(AP,V) for the normal acceleration/deceleration control as the look-up table used for acquiring the requested torque TQr. Hereinafter, the CPU of the PM control section 51 will be referred to as "PM CPU" and the look-up table for acquiring the requested torque TQr will be referred to as "the torque acquisition table".

As a result, even when the condition of executing the enlarged regeneration control is satisfied (that is, when it is determined "Yes" at the steps 905, 935 and 940), the acceleration pedal release prompting display is not performed and the look-up table for the normal acceleration/deceleration control is set as the torque acquisition table MapTQr(AP,V). Thereby, when the ASL switch 84 is set at the ON-position and the own vehicle speed V is near the upper limit vehicle speed Vset (that is, the own vehicle speed V is equal to or larger than the threshold vehicle speed Vth), the execution of the enlarged regeneration control (including the performance of the acceleration pedal release prompting display) is forbidden.

On the other hand, when the value of the forbiddance flag Xkinshi is "0" upon the execution of the process of the step 945, the assist CPU determines "No" at the step 945 and then, proceeds with the process to a step 960 to start to perform the acceleration pedal release prompting display. When the acceleration pedal release prompting display has been already performed, the assist CPU confirms that the acceleration pedal release prompting display has been performed at the step 960.

Next, the assist CPU proceeds with the process to a step 965 to determine whether or not the present acceleration pedal operation amount AP is zero and the elapsed time T is equal to or larger than the threshold time Tth. As described above, the elapsed time T corresponds to a time elapsing from the start of the performance of the acceleration pedal release prompting display.

When the acceleration pedal operation amount AP is zero and the elapsed time T is equal to or larger than the threshold time Tth, the assist CPU determines "Yes" at the step 965. Then, the assist CPU proceeds with the process to a step 970 to provide the PM CPU with a command for causing the PM CPU to set the look-up table MapTQr(AP,V) for the enlarged regeneration control as the torque acquisition table. Then, the assist CPU proceeds with the process to the step 995 to terminate the execution of this routine once. Thereby, the enlarged regeneration control is ready to be started.

On the other hand, when the acceleration pedal operation amount AP is larger than zero or the elapsed time T is smaller than the threshold time Tth upon the execution of the process of the step 965, the assist CPU determines "No" at the step 965 and then, proceeds with the process to a step 985 to provide the PM CPU with a command for causing the PM CPU to set the look-up table MapTQr(AP,V) for the normal acceleration/deceleration control as the torque acquisition table. Then, the assist CPU proceeds with the process to the step 995 to terminate the execution of this routine once.

It should be noted that when the deceleration end position Pend does not exist upon the execution of the process of the step 905, the assist CPU determines "No" at the step 905 and then, proceeds with the process to a step 975 to cancel the target deceleration end position Ptgt if the target deceleration end position Ptgt is set. Then, the assist CPU proceeds with the process to a step 980.

Further, when the estimated vehicle speed Vest is smaller than the brake pedal operation start vehicle speed Vfb upon the execution of the process of the step 935, the assist CPU determines "No" at the step 935 and then, proceeds with the process to the step 980.

In addition, when the battery charge amount SOC is larger than the upper limit charge amount SOCup upon the execution of the process of the step 940, the assist CPU determines "No" at the step 940 and then, proceeds with the process to the step 980.

When the assist CPU proceeds with the process to the step 980 and the acceleration pedal release prompting display is performed, the assist CPU terminates the acceleration pedal release prompting display. On the other hand, when the assist CPU proceeds with the process to the step 980 and the acceleration pedal release prompting display is not performed, the assist CPU forbids the performance of the acceleration pedal release prompting display. Next, the assist CPU proceeds with the process to the step 985 to send the command for causing the PM CPU to set the normal acceleration/deceleration control look-up table MapTQr(AP, V) as the torque acquisition table. Then, the assist CPU proceeds with the process to the step 995 to terminate the execution of this routine once.

Figure 10:
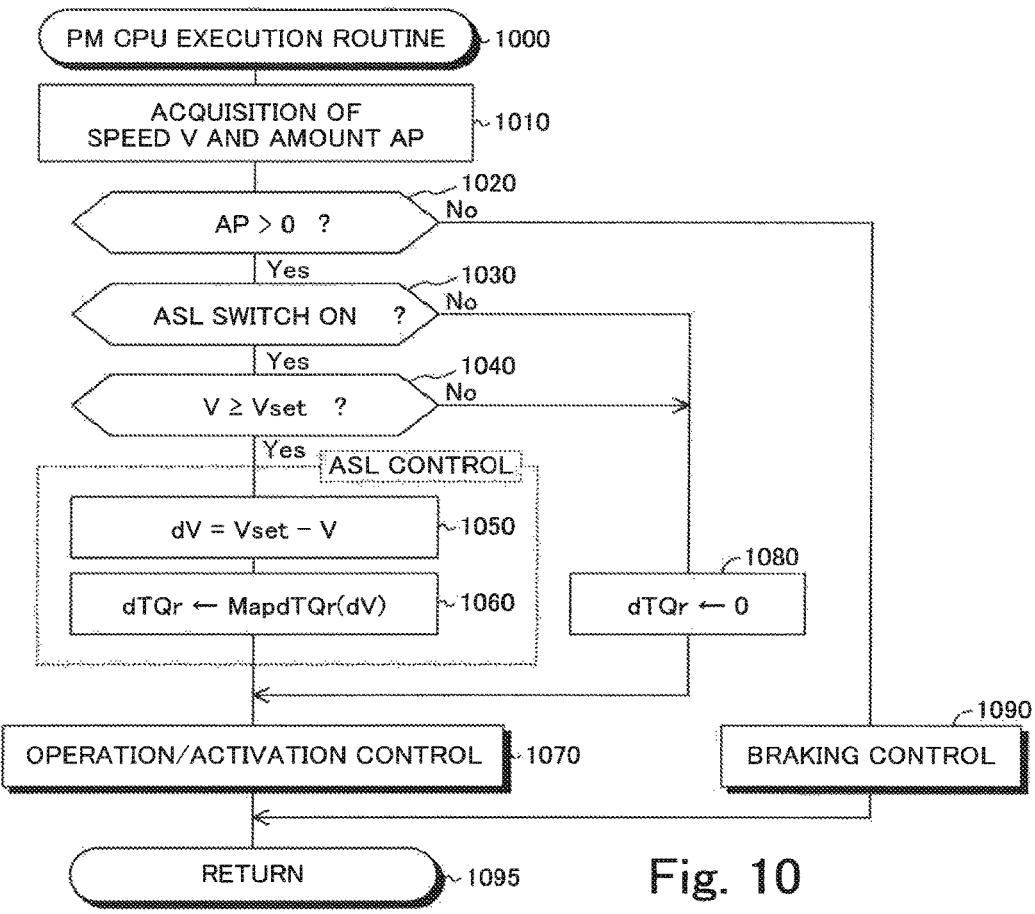
FIG. 10 is a view for showing a flowchart of a routine executed by a CPU of a PM control section shown in FIG. 1.

The PM CPU is configured or programmed to execute a routine shown by a flowchart in FIG. 10 each time a predetermined time elapses. Therefore, at a predetermined timing, the PM CPU starts a process from a step 1000 of FIG. 10 and then, proceeds with the process to a step 1010 to acquire the present own vehicle speed V and the present acceleration pedal amount AP.

Next, the PM CPU proceeds with the process to a step 1020, the PM CPU determines whether or not the acceleration pedal operation amount AP is larger than zero. When the acceleration pedal operation amount AP is larger than zero, the PM CPU determines "Yes" at the step 1020 and then, proceed with the process to a step 1030.

When the PM CPU proceeds with the process to the step 1030, the PM CPU determines whether or not the ASL switch 84 is set at the ON-position. When the ASL switch 84 is set at the ON-position, the PM CPU determines "Yes" at the step 1030 and then, proceeds with the process to a step 1040 to determine whether or not the own vehicle speed V is equal to or larger than the presently-set upper limit vehicle speed Vset. When the own vehicle speed V is equal to or larger than the upper limit vehicle speed Vset, the PM CPU determines "Yes" at the step 1040 and then, sequentially executes processes of steps 1050 and 1060 described below. Then, the PM CPU proceeds with the process to a step 1070 to execute an operation/activation control (see a routine shown in FIG. 11) described later.

Step 1050: The PM CPU calculates the vehicle speed difference dV of the upper limit vehicle speed Vset with respect to the own vehicle speed V (dV=V−Vset).

Step 1060: The PM CPU applies the vehicle speed difference dV to a look-up table MapdTQr(dV) to acquire an amount dTQr used for correcting the requested torque TQr. Hereinafter, the amount dTQr will be referred to as "the requested torque correction amount dTQr". According to the table MapdTQr(dV), the requested torque correction amount dTQr increases as the vehicle speed difference dV increases.

On the other hand, when the ASL switch 84 is set at the OFF-position upon the execution of the process of the step 1030, the PM CPU determines "No" at the step 1030 and then, proceeds with the process to a step 1080 to set the requested torque correction amount dTQr to zero. Then, the PM CPU proceeds with the process to the step 1070 to execute the operation/activation control (see the routine shown in FIG. 11) described later.

When the own vehicle speed V is smaller than the upper limit vehicle speed Vset upon the execution of the process of the step 1040, the PM CPU determines "No" at the step 1040 and then, proceeds with the process to the step 1080. Also, in this case, the requested torque correction amount dTQr is set to zero.

When the acceleration pedal operation amount AP is zero upon the execution of the process of the step 1020, the PM CPU determines "No" at the step 1020 and then, proceeds with the process to a step 1090 to execute a braking control (see a routine shown in FIG. 12) described later.

Figure 11:
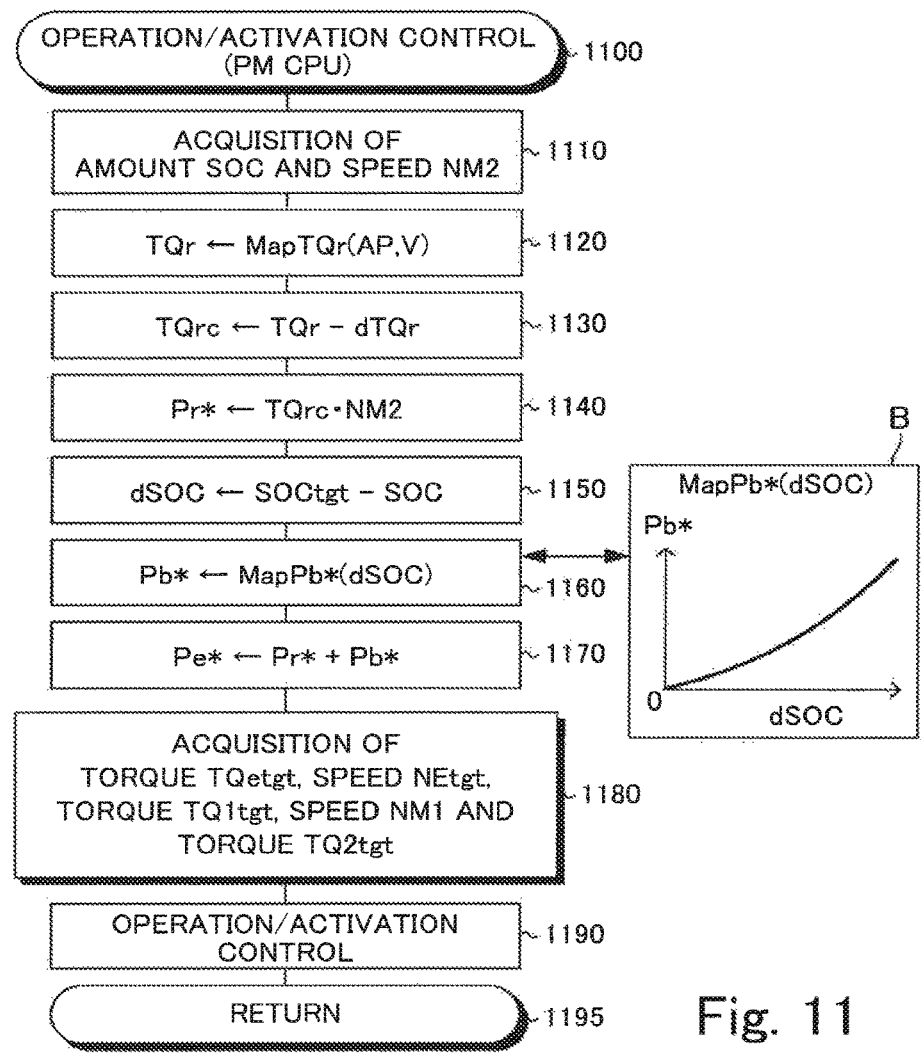
FIG. 11 is a view for showing a flowchart of a routine executed by the CPU of the PM control section shown in FIG. 1.

When the PM CPU proceeds with the process to the step 1070 of FIG. 10, the PM CPU executes the routine shown by a flowchart in FIG. 11 to execute the operation/activation control. Therefore, when the PM CPU proceeds with the process to the step 1070, the PM CPU starts a process from a step 1100 of FIG. 11 and then, sequentially executes processes of steps 1110 to 1190 described below. Then, the PM CPU proceeds with the process to a step 1095 of FIG. 10 via a step 1195.

Step 1110: The PM CPU acquires the present battery charge amount SOC and the present second MG rotation speed NM2.

Step 1120: The PM CPU applies the acceleration pedal operation amount AP and the own vehicle speed V to the torque acquisition table MapTQr(AP,V) presently set in accordance with the command sent from the assist CPU to acquire the requested torque TQr. It should be noted that the PM CPU is configured or programmed to set the normal acceleration/deceleration control look-up table as the torque acquisition table MapTQr(AP,V) at an initialization routine.

Step 1130: The PM CPU calculates the corrected requested torque TQrc by subtracting the requested torque correction amount dTQr from the requested torque TQr (TQrc=TQr−dTQr). At this time, when the ASL control is executed, the requested torque correction amount dTQr is set to a positive predetermined value at the steps 1050 and 1060 of FIG. 10 and thus, the requested torque TQr is corrected such that the requested torque TQr is decreased. On the other hand, when the ASL control is not executed, the requested torque correction amount dTQr is set to zero at the step 1080 of FIG. 10. Therefore, in this case, the requested torque TQr is not corrected and thus, the corrected requested torque TQrc is equal to the requested torque TQr.

Step 1140: The PM CPU calculates the aforementioned requested drive output Pr* by multiplying the corrected requested torque TQrc by the second MG rotation speed NM2 (Pr*=TQrc·NM2).

Step 1150: The PM CPU calculates the charge amount difference dSOC by subtracting the present battery charge amount SOC from the presently-set target charge amount SOCtgt (dSOC=SOCtgt−SOC).

Step 1160: The PM CPU applies the charge amount difference dSOC to a look-up table MapPb*(dSOC) shown in a block B to acquire the requested charge output power Pb*.

Step 1170: The PM CPU calculates a sum of the requested driving output power Pr* and the requested charge output power Pb* as the requested engine output power Pe* (Pe*=Pr*+Pb*).

Step 1080: The PM CPU acquires the target engine torque TQetgt, the target engine speed NEtgt, the target first MG torque TQ1tgt, the target first MG rotation speed NM1tgt, the target second MG torque TQ2tgt and the like on the basis of the second MG rotation speed NM2 and the requested engine output power Pe* as described above.

Step 1190: The PM CPU executes a process for operating the engine 10 and activating the first and second MGs 11 and 12 such that the values acquired at the step 1180 are achieved. That is, the PM CPU sends commands to the engine control section 52 and the MG control section 53.

Figure 12:
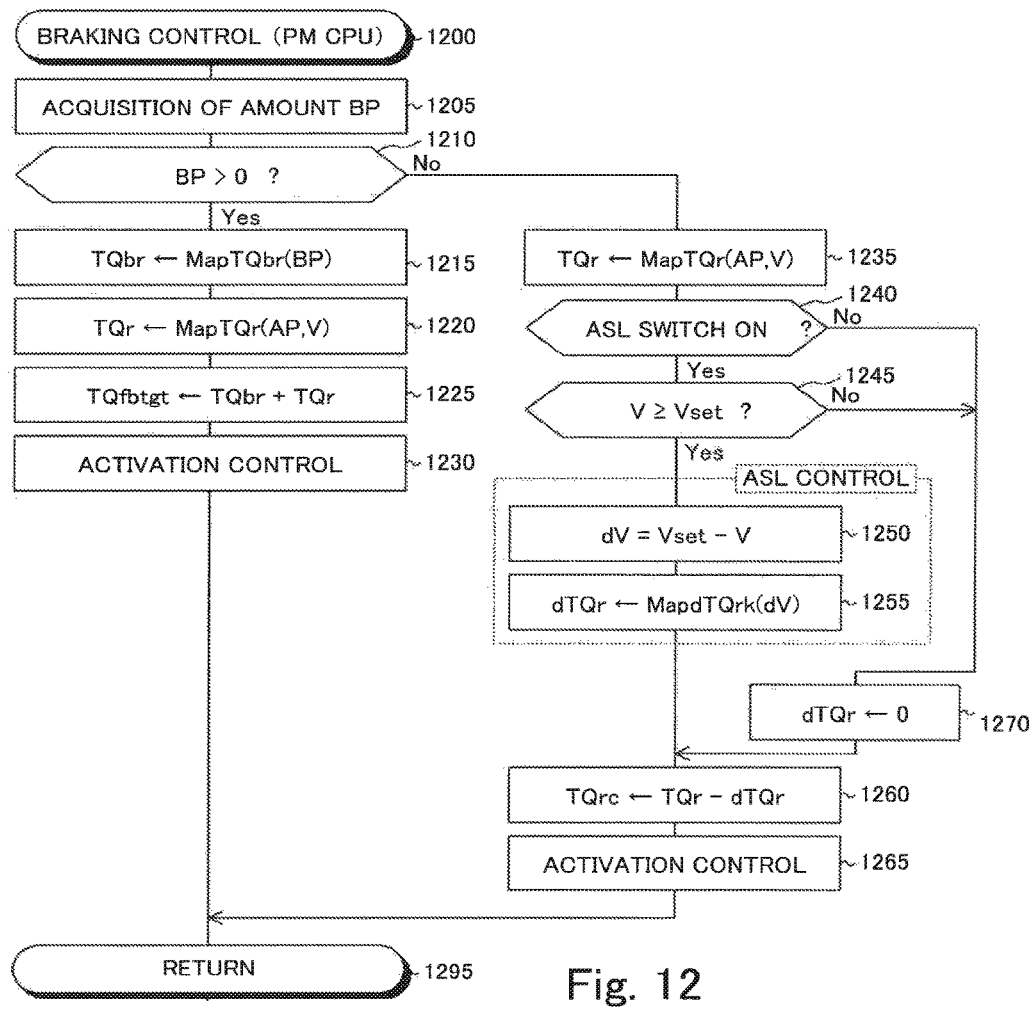
FIG. 12 is a view for showing a flowchart of a routine executed by the CPU of the PM control section shown in FIG. 1.

When the PM CPU proceeds with the process to the step 1090 of FIG. 10, the PM CPU executes a routine shown by a flowchart in FIG. 12 to execute the braking control. That is, when the PM CPU proceeds with the process to the step 1090, the PM CPU starts a process from a step 1200 of FIG. 12 and then, proceeds with the process to a step 1205 to acquire the present brake pedal operation amount BP from the brake ECU 60.

Next, the PM CPU proceeds with the process to a step 1210 to determine whether or not the brake pedal operation amount BP is larger than zero. When the brake pedal operation amount BP is larger than zero, the PM CPU determines "Yes" at the step 1210 and then, sequentially executes processes of steps 1215 to 1230 described below. Then, the PM CPU proceeds with the process to the step 1095 of FIG. 10 via a step 1295.

Step 1215: The PM CPU applies the brake pedal operation amount BP to a look-up table MapTQbr(BP) to acquire the aforementioned requested braking torque TQbr. According to the table MapTQbr(BP), the absolute value of the requested braking torque TQbr increases as the brake pedal operation amount BP increases.

Step 1220: The PM CPU applies the acceleration pedal operation amount AP (in this case, the acceleration pedal operation amount AP is zero) and the own vehicle speed V to the presently-set torque acquisition table MapTQr(AP,V) to acquire the requested torque TQr. When the own vehicle speed V is larger than the switching vehicle speed V1, the acquired requested torque TQr is a negative value (i.e., the braking torque). On the other hand, when the own vehicle speed V is equal to or smaller than the switching vehicle speed V1, the acquired requested torque TQr is a positive value (i.e., the driving torque).

In particular, when the look-up table to be used in the enlarged regeneration control is set as the torque acquisition table MapTQr(AP,V), the acquired requested torque TQr is the enlarged regeneration braking torque TQmbk with the own vehicle speed V being larger than the switching vehicle speed V1 and the acquired requested torque TQr is the driving torque TQmdk with the own vehicle speed V being equal to or smaller than the switching vehicle speed V1.

On the other hand, when the look-up table to be used in the normal acceleration/deceleration control is set as the torque acquisition table MapTQr(AP,V), the acquired requested torque TQr is the normal regeneration braking torque TQmbn with the own vehicle speed V being larger than the switching vehicle speed V1 and the acquired requested torque TQr is the driving torque TQmdn with the own vehicle speed V being equal to or smaller than the switching vehicle speed V1.

Step 1225: The PM CPU calculates the target friction braking torque TQfbtgt by adding the requested torque TQr to the requested braking torque TQbr (TQfbtgt=TQbr+TQr).

Step 1230: The PM CPU executes a process for activating the second MG 12 (i.e., a process for sending a command to the MG control section 53) such that the requested torque TQr is supplied from the second MG 12 to the driving wheels 19. Further, the PM CPU sends the target friction braking torque TQfbtgt to the brake ECU 60. As a result, a half of the requested torque TQr is supplied from the second MG 12 to the driving wheels 19, respectively and one-fourth of the target friction braking torque TQfbtgt is applied to each of the vehicle wheels including the driving wheels 19 by the friction brake mechanism 40.

On the other hand, when the brake pedal operation amount BP is zero upon the execution of the process of the step 1210, the PM CPU determines "No" at the step 1210 and then, proceeds with the process to a step 1235 to acquire the requested torque TQr similar to the process of the step 1220.

Next, the PM CPU proceeds with the process to a step 1240 to determine whether or not the ASL switch 84 is set to the ON-position. When the ASL switch 84 is set to the ON-position, the PM CPU determines "Yes" at the step 1240 and then, proceeds with the process to a step 1245 to determine whether or not the own vehicle speed V is equal to or larger than the upper limit vehicle speed Vset.

When the own vehicle speed V is equal to or larger than the upper limit vehicle speed Vset, the PM CPU determines "Yes" at the step 1245 and then, sequentially executes processes of steps 1250 to 1265 described below. Then, the PM CPU proceeds with the process to the step 1095 of FIG. 10 via the step 1295.

Step 1250: The PM CPU calculates the vehicle speed difference dV of the own vehicle speed V with respect to the upper limit vehicle speed Vset (dV=V−Vset).

Step 1255: The PM CPU applies the vehicle speed difference dV to a look-up table MapdTQrk(dV) to acquire the requested torque correction amount dTQr (>0). According to the table MapdTQrk(dV), the requested torque correction amount dTQr increases as the vehicle speed difference dV increases.

Step 1260: The PM CPU calculates the corrected requested torque TQrc by subtracting the requested torque correction amount dTQr from the requested torque TQr (TQrc=TQr−dTQr). At this time, the requested torque correction amount dTQr is set to a predetermined positive value by the processes of the steps 1250 and 1255 and thus, the requested torque TQr is corrected such that the requested torque TQr is decreased (i.e., the requested torque TQr is a negative value and the absolute value of the requested torque TQr increases).

Step 1265: The PM CPU executes a process for activating the second MG 12 (i.e., a process for sending a command to the MG control section 53) such that the corrected requested torque TQrc set at the 1260 is supplied from the second MG 12 to the driving wheels 19. Further, the PM CPU sends information that the target friction braking torque TQfbtgt is zero to the brake ECU 60. As a result, no friction braking force is generated by the friction brake mechanism 40.

On the other hand, when the ASL switch 84 is set to the OFF-position and when the own vehicle speed V is smaller than the upper limit vehicle speed Vset, the PM CPU determines "No" at the steps 1240 and 1245, respectively and then, proceeds with the process to a step 1270 to set the requested torque correction amount dTQr to zero. Then, the PM CPU executes the processes of the steps 1260 and 1265 and then, proceeds with the process to the step 1095 of FIG. 10 via the step 1295.

The concrete operation of the embodiment control apparatus has been described. Thereby, when the ASL switch 84 is set at the ON-position (that is, the ASL control execution request or the vehicle speed limit control execution request is generated) and the own vehicle speed V is adjacent to the upper limit vehicle speed Vset (that is, the own vehicle speed V is equal to or larger than the threshold vehicle speed Vth), the execution of the enlarged regeneration control is forbidden and thus, the driver is prevented from feeling discomfort. On the other hand, when the ASL switch 84 is set at the ON-position and the own vehicle speed V is smaller than the threshold vehicle speed Vth, the execution of the enlarged regeneration control is permitted and thus, the amount of the vehicle traveling energy recovered to the battery 14 as the electricity increases. It should be noted that when the ASL switch 84 has been set at the OFF-position, the execution of the enlarged regeneration control is permitted, independently of the own vehicle speed V.

The present invention is not limited to the aforementioned embodiment and various modifications can be employed within a scope of the present invention. For example, the embodiment control apparatus terminates or forbids the acceleration pedal release prompting display when the embodiment control apparatus forbids the execution of the enlarged regeneration control. In this regard, the embodiment control apparatus may be configured to continue the acceleration pedal release prompting display. In this case, when the acceleration pedal 35 is released, the embodiment control apparatus forbids the application of the enlarged regeneration braking torque using the property line of the requested torque TQr used in the enlarged regeneration control and performs the regeneration braking using the property line of the requested torque TQr used for the normal regeneration control.

Further, in the embodiment, the step 940 of FIG. 9 may be omitted. In this case, when the estimated vehicle speed Vest acquired upon the execution of the process of the step 935 is equal to or larger than the brake pedal operation start vehicle speed Vfb, the assist CPU determines "Yes" at the step 935 and then, proceeds with the process to the step 945, directly.

Further, the upper limit vehicle speed Vset may be an upper limit vehicle speed permitted in traffic regulation, described on the traffic sign installed along the road and applied to the own vehicle. The upper limit vehicle speed may be realized or acquired by processing the image data acquired by the in-vehicle camera 82 by the assist CPU. In addition, the upper limit vehicle speed Vset may be an upper limit vehicle speed permitted at the road along which the own vehicle travels, sent from the outside of the own vehicle, for example, the external communication devices 100 through the wireless communication and applied to the own vehicle.

Further, the assist control section 54 may be configured to execute the deceleration prediction assist control such that the assist control section 54 acquires the difference (i.e., the relative speed) between the own vehicle speed V of the own vehicle and the vehicle speed of the preceding vehicle, the distance (i.e., the inter-vehicle distance) between the own vehicle and the preceding vehicle on the basis of information received from the own vehicle sensor 83 and when the assist control section 54 determines that the preceding vehicle stops on the basis of the acquired relative speed and the acquired inter-vehicle distance, the assist control section 54 may be configured to store the position where the own vehicle should be stopped in the RAM of the assist control section 54 as the deceleration end position Pend. In this case, the assist control section 54 stores the own vehicle speed V of the own vehicle acquired upon the arrival at the deceleration end position Pend (in this case, the own vehicle speed V is 0 km/h) in the RAM of the assist control section 54 as the deceleration end vehicle speed Vend in association with the deceleration end position Pend.

In addition, the own vehicle, to which the embodiment control apparatus is applied, may be a vehicle comprising one of the first MG 11 and the second MG 12.

Further, the embodiment control apparatus applies the braking torque to the driving wheels 19 only from the second MG 12 in the enlarged regeneration control and the normal regeneration control. However, the embodiment control apparatus may be configured to apply the braking torque from the second MG 12 and the engine 10 to the driving wheels 19.

What is claimed is:

1. A vehicle control apparatus applied to a hybrid vehicle having:
    a vehicle driving source including an internal combustion engine and a motor generator; and
    a battery for supplying electricity to the motor generator, the battery being configured to be charged with electricity generated by the motor generator,
    the vehicle control apparatus comprising an electronic control unit configured to control an operation of the internal combustion engine and an activation of the motor generator,
    wherein the electronic control unit is configured to:
        execute a normal regeneration control for charging the battery with the electricity generated by the motor generator while applying normal regeneration braking force to at least one vehicle wheel from the motor generator when an operation amount of an acceleration operator is zero;
        execute an enlarged regeneration control for charging the battery with the electricity generated by the motor generator while applying increased regeneration braking force to the at least one vehicle wheel from the motor generator when a predicted deceleration end position on a scheduled traveling route where a deceleration of the hybrid vehicle is predicted to end is set as a target deceleration end position on the scheduled traveling route where the deceleration of the hybrid vehicle ends and the operation amount of the acceleration operator is zero, the increased regeneration braking force being larger than the normal regeneration braking force, the scheduled traveling route being a route along which the hybrid vehicle is scheduled to travel;

control the operation of the internal combustion engine and the activation of the motor generator to decrease driving force output from the internal combustion engine for driving the hybrid vehicle such that a traveling speed of the hybrid vehicle is controlled to a speed equal to or smaller than an upper limit vehicle speed when a control execution request is generated due to an operation of a switch by an occupant of the hybrid vehicle and the traveling speed of the hybrid vehicle exceeds the upper limit vehicle speed; and forbid an execution of the enlarged regeneration control when the control execution request is generated and the traveling speed of the hybrid vehicle is equal to or larger than a threshold vehicle speed smaller than the upper limit vehicle speed by a predetermined vehicle speed.

2. The vehicle control apparatus according to claim 1, wherein the electronic control unit is configured to execute the enlarged regeneration control to:

start an informing for prompting the driver to release the acceleration operator when the hybrid vehicle arrives at a predetermined first position before the target deceleration end position and the target deceleration end position is set; and apply the increased regeneration braking force to the vehicle wheel after the hybrid vehicle arrives at a predetermined second position between the predeteinined first position and the target deceleration end position.

* * * * *